US009894405B2

(12) United States Patent
Heinz, II et al.

(10) Patent No.: US 9,894,405 B2
(45) Date of Patent: *Feb. 13, 2018

(54) OBJECT DISCOVERY AND EXPLORATION IN VIDEO CONTENT

(71) Applicant: Amazon Technologies, Inc., Reno, NV (US)

(72) Inventors: Gerard Joseph Heinz, II, Seattle, WA (US); Michael Schleif Pesce, Seattle, WA (US); Collin Charles Davis, Seattle, WA (US); Michael Anthony Frazzini, Seattle, WA (US); Ashraf Alkarmi, Seattle, WA (US); Michael Martin George, Mercer Island, WA (US); David A. Limp, Medina, WA (US); William Dugald Carr, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/318,013

(22) Filed: Jun. 27, 2014

(65) Prior Publication Data
US 2015/0264425 A1 Sep. 17, 2015

Related U.S. Application Data

(60) Provisional application No. 61/951,495, filed on Mar. 11, 2014.

(51) Int. Cl.
*H04N 21/431* (2011.01)
*G11B 20/10* (2006.01)
(Continued)

(52) U.S. Cl.
CPC ......... *H04N 21/4318* (2013.01); *G06T 19/00* (2013.01); *G11B 27/00* (2013.01);
(Continued)

(58) Field of Classification Search
None
See application file for complete search history.

(56) References Cited

U.S. PATENT DOCUMENTS

| 5,261,820 A | 11/1993 | Slye et al. |
| 5,395,242 A | 3/1995 | Slye et al. |

(Continued)

FOREIGN PATENT DOCUMENTS

WO WO2009/101624 * 8/2009

OTHER PUBLICATIONS

International Search Report and Written Opinion in PCT/US15/19992, dated Jun. 29, 2015, Amazon Technologies, Inc., pp. 1-11.
(Continued)

*Primary Examiner* — Saptarshi Mazumder
(74) *Attorney, Agent, or Firm* — Robert C. Kowert; Meyertons, Hood, Kivlin, Kowert & Goetzel, P.C.

(57) ABSTRACT

A real-time video exploration (RVE) system that allows users to pause, step into, move through, and explore 2D or 3D modeled worlds of scenes in a video. The RVE system may allow users to discover, select, explore, and manipulate objects within the modeled worlds used to generate video content. The RVE system may implement methods that allow users to view and explore in more detail the features, components, and/or accessories of selected objects that are being manipulated and explored. The RVE system may also implement methods that allow users to interact with interfaces of selected objects or interfaces of components of selected objects.

20 Claims, 21 Drawing Sheets

(51) Int. Cl.
| | |
|---|---|
| *H04N 9/87* | (2006.01) |
| *H04N 21/472* | (2011.01) |
| *G06T 19/00* | (2011.01) |
| *G11B 27/00* | (2006.01) |
| G06T 17/00 | (2006.01) |
| G11B 27/031 | (2006.01) |
| H04N 5/91 | (2006.01) |

(52) U.S. Cl.
CPC ....... *H04N 21/47205* (2013.01); *G06T 17/00* (2013.01); *G11B 27/031* (2013.01); *H04N 5/91* (2013.01)

(56) References Cited

U.S. PATENT DOCUMENTS

| | | | | |
|---|---|---|---|---|
| 5,630,043 | A | * | 5/1997 | Uhlin .................. G06T 17/00 345/474 |
| 5,682,196 | A | | 10/1997 | Freeman |
| 6,173,260 | B1 | | 1/2001 | Slaney |
| 6,275,806 | B1 | | 8/2001 | Pertrushin |
| 6,476,802 | B1 | * | 11/2002 | Rose .................. G06T 13/00 345/419 |
| 6,754,905 | B2 | | 6/2004 | Gordon et al. |
| 7,451,079 | B2 | | 11/2008 | Oudeyer |
| 7,500,258 | B1 | | 3/2009 | Eldering |
| 7,606,701 | B2 | | 10/2009 | Degani et al. |
| 7,803,052 | B2 | | 9/2010 | Multerer et al. |
| 7,940,914 | B2 | | 5/2011 | Pertrushin |
| 8,078,470 | B2 | | 12/2011 | Levanon et al. |
| 8,096,863 | B2 | | 1/2012 | Annunziata |
| 8,308,562 | B2 | | 11/2012 | Patton |
| 2007/0024612 | A1 | | 2/2007 | Balfour |
| 2008/0300700 | A1 | | 12/2008 | Hammer et al. |
| 2009/0169168 | A1 | * | 7/2009 | Ishikawa .......... G06F 17/30017 386/278 |
| 2009/0325138 | A1 | * | 12/2009 | Shuster ................. G09B 5/00 434/350 |
| 2011/0064388 | A1 | * | 3/2011 | Brown .................. G06T 13/20 386/285 |
| 2012/0052476 | A1 | | 3/2012 | Graesser et al. |
| 2012/0167134 | A1 | | 6/2012 | Hendricks et al. |
| 2012/0179968 | A1 | * | 7/2012 | Madnick .............. G06Q 30/02 715/719 |
| 2013/0011121 | A1 | * | 1/2013 | Forsyth ............... H04N 9/8227 386/245 |
| 2013/0080926 | A1 | * | 3/2013 | Katakawa ............ G06Q 30/02 715/753 |
| 2013/0241926 | A1 | * | 9/2013 | Asaria .................. G06Q 10/00 345/419 |
| 2014/0171039 | A1 | | 6/2014 | Bjontegard |
| 2014/0259056 | A1 | * | 9/2014 | Grusd ................ H04N 21/8583 725/34 |
| 2015/0139610 | A1 | | 5/2015 | Syed et al. |

OTHER PUBLICATIONS

Wang, Jinjun, et al., "Sports highlight detection from keyword sequences using HMM", Multimedia and Expo, 2004, ICME'04, IEEE International Conference, pp. 1-5, vol. 1.
Ren, et al., "Affective sports highlight detection", 15th European Signal Processing Conference, Sep. 3-7, 2007, pp. 728-732.
Isao Otsuka, et al., "A Highlight Scene Detection and Video Summarization System Using Audio Feature for a Personal Video Recorder", Consumer Electronics, IEEE Transactions on 51.1, Dec. 2005, pp. 112-116.
Changsheng Xu, et al., "Live Sports Even Detection Based on Broadcast Video and Web-casting Text", Proceedings of the 14th annual ACM international conference on Multimedia, ACM, 2006, pp. 221-230.
Menu Kaytoue, et al. "Watch me playing, I am a professional: a first study on video game live streaming", Proceedings of the 21st international conference companion on World Wide Web, ACM, 2012, pp. 1-8.
Gifford Cheung, et al., "Starcraft from the stands: understanding the game spectator", Proceedings of the SIGCHI Conference on Human Factors in Computing Systems, ACM, 201, pp. 1-10.
Thomas P. B. Smith, et al."Live-streaming changes the (video) game." Proceedings of the 11th European conference on Interactive TV and video. ACM, 2013, pp. 131-138.
William A. Hamilton, et al., "Streaming on twitch: fostering participatory communities of play within live mixed media." Proceedings of the SIGCHI Conference on Human Factors in Computing Systems. ACM, 2014, pp. 1-10.
M.A. Anusuya, et al., "Speech Recognition by Machine: A Review", International Journal of Computer Science and Information Security, 2009, pp. 181-205, vol. 6, No. 3.
Rank Dellaert, et al., "Recgonizing Emotion in Speech", IEEE, Spoken Language, 1996, pp. 1-4 Proceedings., Fourth International Conference on. vol. 3.
Santosh K. Gaikwad, et al., "A Review on Speech Recognition Technique", International Journal of Computer Applications, Nov. 2010, pp. 16-24, vol. 10, No. 3.
Kiel Mark Gilleade, et al., "Afftective Videogames and Modes of Affectived Gaming: Assist me, Challenge Me, Emote Me", Proceedings of DiGRA 2005 Conference, 2005, pp. 1-7.
Eva Hudlicka, "Affective Game Engines: Motivation and Requirements", Proceeding of the 4th International Conference on Foundations of Digital Games, ACM, Apr. 26-30, 2009, pp. 1-9, Orlando, Florida, USA.
Christian Martyn Jones, et al., "Creating an emotionally reactive computer game responding to affective cues in speech", HCI Proceedings, 2005, pp. 1-2, vol. 2.
Paul P.A.B. Merkx, et al., "Inducing and Measuring Emotion through a Multiplayer First-Person Shooter Computer Game", Proceedings of the Computer Games Workshop, 2007, pp. 1-12.
Alan Murphy, Dr. Sam Redfern. "Utilizing Bimodal Emotion Recognition for Adaptive Artificial Intelligence." International Journal of Engineering Science and Innovative Technology (IJESIT), Jul. 2013, pp. 167-173, vol. 2, Issue 4.
RN Schuller, et al., "Acoustic Emotion Recognition: A Benchmark Comparison of Performances", IEEE, ASRU 2009, pp. 552-557.
Norman Makoto Su, et al., "Virtual Spectating: Hearing Beyond the Video Arcade", Proceedings of the 25th BCS conference on human-computer interaction. British Computer Society, 2011, pp. 269-278.
Thurid Vogt, et al., "Automatic Recognition of Emotions from Speech: A Review of the Literature and Recommendations for Practical Realisation", . Affect and emotion in HCI, LNCS 4868, Springer Berlin Heidelberg, 2008, pp. 75-91.
Greg Wadley, et al., "Towards a Framework for Designing Speech-Based Player Interaction in Multiplayer Online Games", Proceedings of the second Australasian conference on Interactive entertainment. Creativity & Cognition Studios Press, 2005, pp. 1-4.
U.S. Appl. No. 14/754,584, filed Jun. 29, 2015, Michael Anthony Willette, et al.
U.S. Appl. No. 14/754,575, filed Jun. 29, 2015, Michael Anthony Willette, et al.
U.S. Appl. No. 14/732,580, filed Jun. 5, 2015, Ethan Zane Evans, et al.
U.S. Appl. No. 14/732,582, filed Jun. 5, 2015, Ethan Zane Evans, et al.
U.S. Appl. No. 14/755,922, filed Jun. 30, 2015, David Hendrik Verfaillie et al.
U.S. Appl. No. 14/755,905, filed Jun. 30, 2015, Michael Anthony Willette et al.
U.S. Appl. No. 14/755,955, filed Jun. 30, 2015, Christopher Paul Dury et al.
U.S. Appl. No. 14/755,934, filed Jun. 30, 2015, Rohit Garg et al.
U.S. Appl. No. 14/755,944, filed Jun. 30, 2015, Robert Harvey Oates.
U.S. Appl. No. 14/755,967, filed Jun. 30, 2015, Patrick Gilmore et al.
U.S. Appl. No. 14/755,974, filed Jun. 30, 2015, Hok Peng Leung et al.
U.S. Appl. No. 14/318,093, filed Jun. 27, 2014, Michael Martin George.

(56) References Cited

OTHER PUBLICATIONS

U.S. Appl. No. 14/318,083, filed Jun. 27, 2014, Michael Martin George.
U.S. Appl. No. 14/318,117, filed Jun. 27, 2014, Michael Martin George.
U.S. Appl. No. 14/076,815, filed Nov. 11, 2013, Jonathan Paul Thompson.
U.S. Appl. No. 14/077,180, filed Nov. 11, 2013, Gerard Joseph Heinz, II.
U.S. Appl. No. 14/077,186, filed Nov. 11, 2013, Gerard Joseph Heinz, II.
Wang, Jue, et al. "Interactive video cutout." ACM Transactions on Graphics (TOG). vol. 24. No. 3. ACM, 2005.
Smolic, Aljoscha, et al. "3d video and free viewpoint video-technologies, applications and mpeg standards." Multimedia and Expo, 2006 IEEE International Conference on. IEEE, 2006.
Karsten, Müller, et al. "View synthesis for advanced 3D video systems." EURASIP Journal on Image and Video Processing 2008 (2009).
Ballan, Luca, et al. "Unstructured video-based rendering: Interactive exploration of casually captured videos." ACM Transactions on Graphics (TOG) 29.4 (2010): 87.
Smolic, Aljoscha, Hideaki Kimata, and Anthony Vetro. "Development of MPEG standards for 3D and free viewpoint video." Optics East 2005. International Society for Optics and Photonics, 2005.
Amazon Web Services, "Amazon AppStream Developer Guide", Nov. 13, 2013, pp. 1-200.
U.S. Appl. No. 14/318,042, filed Jun. 27, 2014, Gerald Joseph Heinz, II.
U.S. Appl. No. 14/318,002, filed Jun. 27, 2014, Gerald Joseph Heinz, II.
U.S. Appl. No. 14/318,026, filed Jun. 27, 2014, Gerald Joseph Heinz, II.
U.S. Appl. No. 14/317,984, filed Jun. 27, 2014, Gerald Joseph Heinz, II.
U.S. Appl. No. 14/500,413, filed Sep. 29, 2014, Collin Charles Davis.
U.S. Appl. No. 14/500,451, filed Sep. 29, 2014, Michael Anthony Frazzini.
U.S. Appl. No. 14/500,619, filed Sep. 29, 2014, Christian Robert Cabanero.
U.S. Appl. No. 14/500,593, filed Sep. 29, 2014, Christian Robert Cabanero.
U.S. Appl. No. 14/500,600, filed Sep. 29, 2014, Christian Robert Cabanero.
U.S. Appl. No. 14/500,580, filed Sep. 29, 2014, Christian Robert Cabanero.

\* cited by examiner

OBJECT DISCOVERY AND EXPLORATION IN VIDEO CONTENT

This application claims benefit of priority of U.S. Provisional Application Ser. No. 61/951,495 entitled "OBJECT DISCOVERY AND EXPLORATION IN VIDEO CONTENT" filed Mar. 11, 2014, the content of which is incorporated by reference herein in its entirety.

BACKGROUND

Much video produced today, including but not limited to movies, shorts, cartoons, commercials, and television and cable programs, is at least partially generated using two-dimensional (2D) or three-dimensional (3D) computer graphics techniques. For example, modern animated movies are typically generated using various 3D computer graphics techniques as implemented by various 3D graphics applications to generate 3D representations or models of scenes, and then applying 3D rendering techniques to render two-dimensional (2D) representations of the 3D scenes. As another example, scenes in some video such as movies may be generated by filming live actor(s) using green- or blue-screen technology, and filling in the background and/or adding other content or effects using one or more 3D computer graphics techniques.

Generating a scene using computer graphics techniques may, for example, involve generating a background for the scene, generating one or more objects for the scene, combining the background and objects(s) into a representation or model of the scene, and applying rendering techniques to render a representation of the model of the scene as output. Each object in a scene may be generated according to an object model that includes but is not limited to an object frame or shape (e.g., a wire frame), surface texture(s), and color(s). Rendering of a scene may include applying global operations or effects to the scene such as illumination, reflection, shadows, and simulated effects such as rain, fire, smoke, dust, and fog, and may also include applying other techniques such as animation techniques for the object(s) in the scene. Rendering typically generates as output sequences of 2D video frames for the scenes, and the video frame sequences may be joined, merged, and edited as necessary to generate final video output, for example a movie.

In video production, for example in movie production that uses 2D or 3D techniques as described above, a director (or other entity) selects a viewpoint or perspective for each scene, and the final output is a video (e.g., a movie) that presents a 2D representation of the environments that were generated and used to render the video, with each frame of each scene shown from a pre-selected perspective. Thus, a consumer of the video (e.g., an animated movie) views the scenes in the movie from perspectives that were pre-selected by the director, and all consumers view the movie from the same perspectives.

Figure 1A:
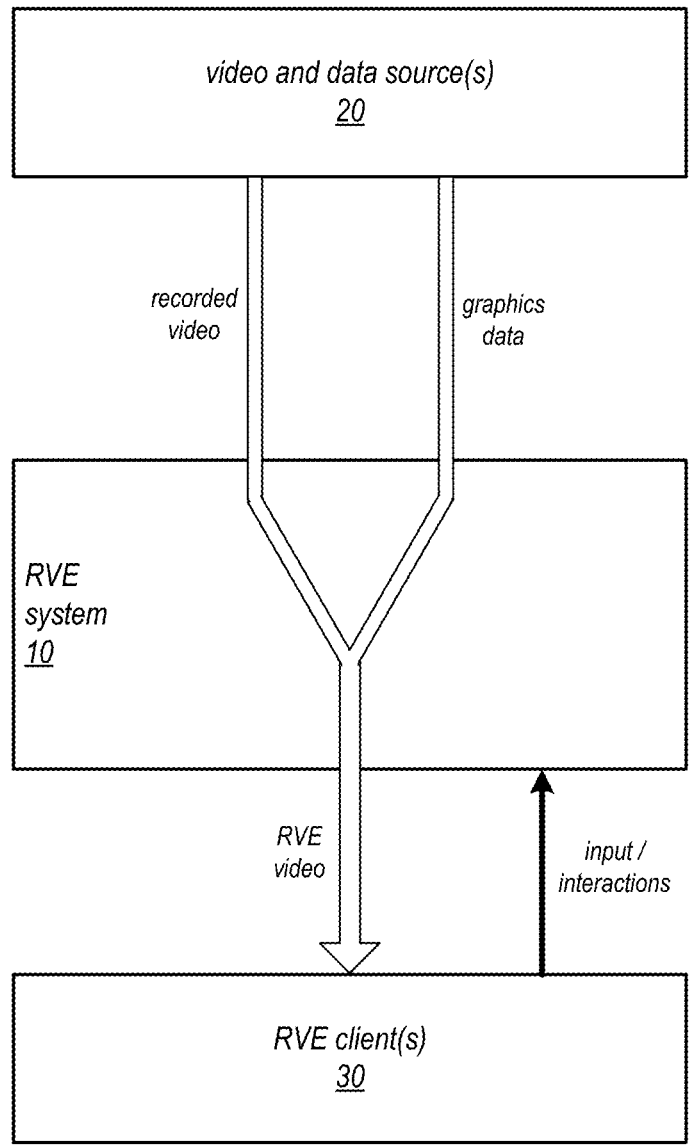
FIG. 1A is a high-level illustration of a real-time video exploration (RVE) system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for generating, presenting, and exploring two-dimensional (2D) or three-dimensional (3D) modeled worlds from within pre-rendered video are described. Video, including but not limited to movies, may be produced using 2D or 3D computer graphics techniques to generate 2D or 3D modeled worlds for scenes and render representations of the modeled worlds from selected camera viewpoints as output. In video production, scene content (e.g., objects, textures, colors, backgrounds, etc.) is determined for each scene, a camera viewpoint or perspective is pre-selected for each scene, the scenes (each representing a 2D or 3D world) are generated and rendered according to computer graphics techniques, and the final rendered output video (e.g., a movie) includes a representation of the modeled worlds, with each frame of each scene rendered and shown from a fixed, pre-selected camera viewpoint and angle, and with fixed, predetermined content. Thus, conventionally, a consumer of pre-rendered video (e.g., a movie) views the scenes in the movie from pre-selected camera viewpoints and angles, and with pre-determined content.

Large amounts of 2D or 3D graphics data may be used in generating and rendering scenes for video (e.g., for movies) according to computer graphics techniques. Note that this graphics data may be used in 2D or 3D rendering of video content according to different production techniques, for example in producing fully rendered, animated video content according to computer graphics techniques as well as in producing partially rendered video content that involves filming live action using green- or blue-screen technology and filling in the background and/or adding other content or effects using one or more computer graphics techniques. For a given scene, this graphics data may include, but is not limited to, 2D or 3D object model data such as object frames or shapes (e.g., wire frames), wraps for the frames, surface textures and patterns, colors, animation models, and so on, that is used to generate models of objects for the scene; general scene information such as surfaces, vanishing points, textures, colors, lighting sources, and so on; information for global operations or effects in the scenes such as illumination, reflection, shadows, and simulated effects such as rain, fire, smoke, dust, and fog; and in general any information or data that may be used in generating a modeled world for the scene and in rendering 2D representations of the world (e.g., video frames) as video output. This graphics data used in generating videos (e.g., movies) includes rich 2D or 3D content that is not presented to the viewer in conventional video, as the viewer views the scenes in the video rendered from perspectives that were pre-selected by the director, and all viewers of the video view the scenes from the same perspectives. However, this graphics data may be available or may be made available, and if not available at least some graphics data may be generated from the original video, for example using various 2D-to-3D modeling techniques.

Embodiments of real-time video exploration (RVE) methods and systems are described that may leverage this 2D or 3D graphics data to enable interactive exploration of 2D or 3D modeled worlds from scenes in pre-rendered, pre-recorded video by generating and rendering new video content in real time at least in part from the 2D or 3D graphics data. Embodiments of the RVE methods and systems are generally described herein with respect to interactive exploration of 3D modeled worlds. However, embodiments may also be applied in generating and rendering 2D models and objects for video using 2D graphics techniques to enable interactive exploration of 2D modeled worlds.

FIG. 1A is a high-level illustration of a real-time video exploration (RVE) system 10, according to at least some embodiments. Embodiments of an RVE system 10 may, for example, allow a video consumer (also referred to herein as a user or viewer), via an RVE client 30, to "step into" a scene in a video (e.g., a movie) to explore the rest of the 3D modeled world "behind the scenes" via a user-controlled, free-roaming "camera" that allows the user to change viewing positions and angles in the 3D modeled world.

In at least some embodiments, the RVE system 10 may play back video from one or more sources 20 to one or more RVE clients 30, receive user input/interactions within scenes being explored from respective RVE clients 30, responsively generate or update 3D models from graphics data obtained from one or more sources 20 in response to the user input/interactions exploring the scenes, render new video content of the scenes at least in part from the 3D models, and deliver the newly rendered video content (and audio, if present) to the respective RVE clients 30 as RVE video. Thus, rather than just viewing a pre-rendered scene in a movie from a perspective that was pre-selected by a director, a user may step into and explore the scene from different angles, wander around the scene at will within the scope of the 3D modeled world, and discover hidden objects and/or parts of the scene that are not visible in the original video as recorded. The RVE video that is output to the client(s) 30 by RVE system 10 is a video stream that has been processed and rendered according to two inputs, one input being the user's exploratory inputs, the second input being the recorded video and/or graphics data obtained from source(s) 20. In at least some embodiments, RVE system 10 may provide one or more application programming interfaces (APIs) for receiving input from and sending output to RVE client(s) 30.

Figure 13:
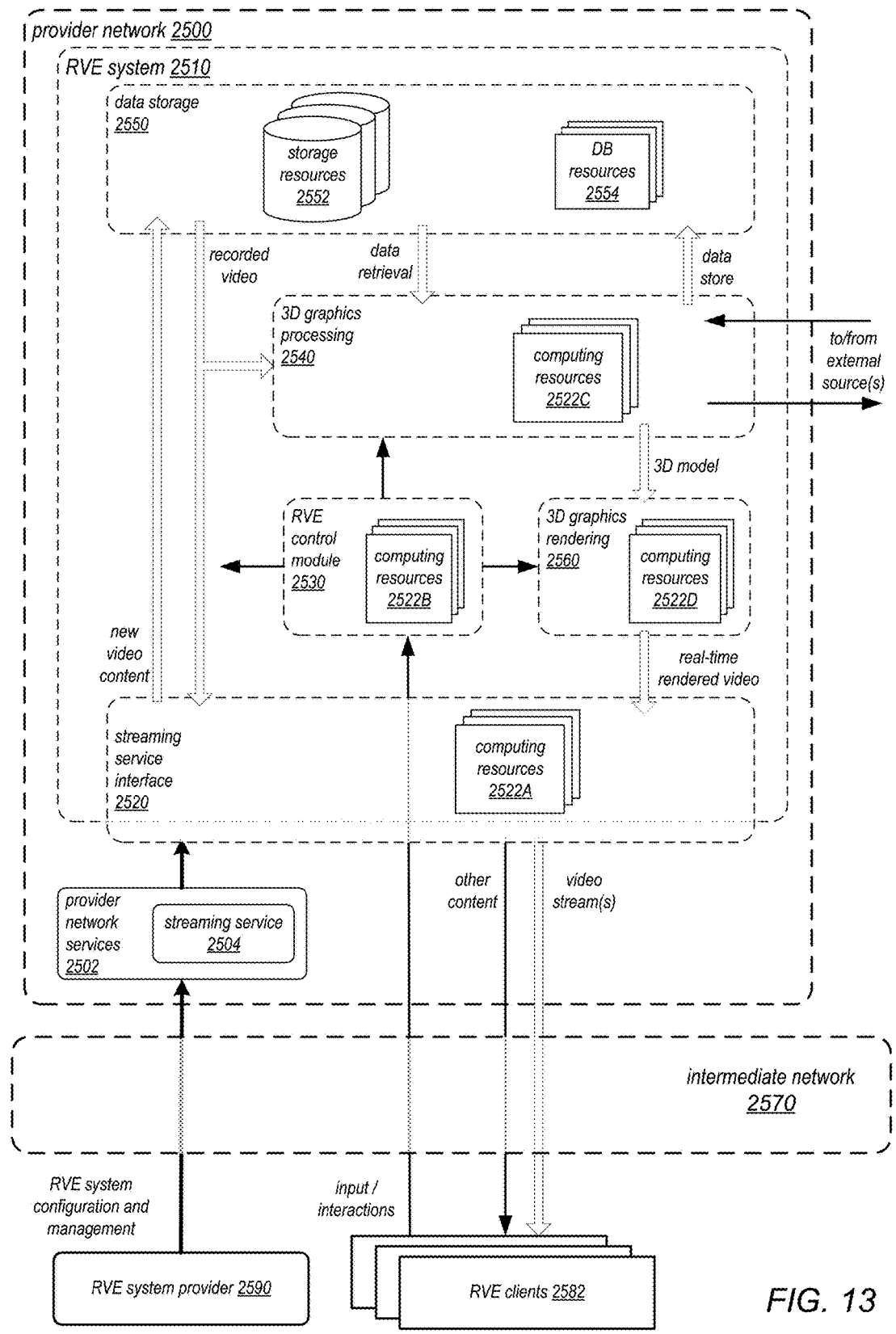
FIG. 13 illustrates an example network-based RVE environment, according to at least some embodiments.
Figure 14:
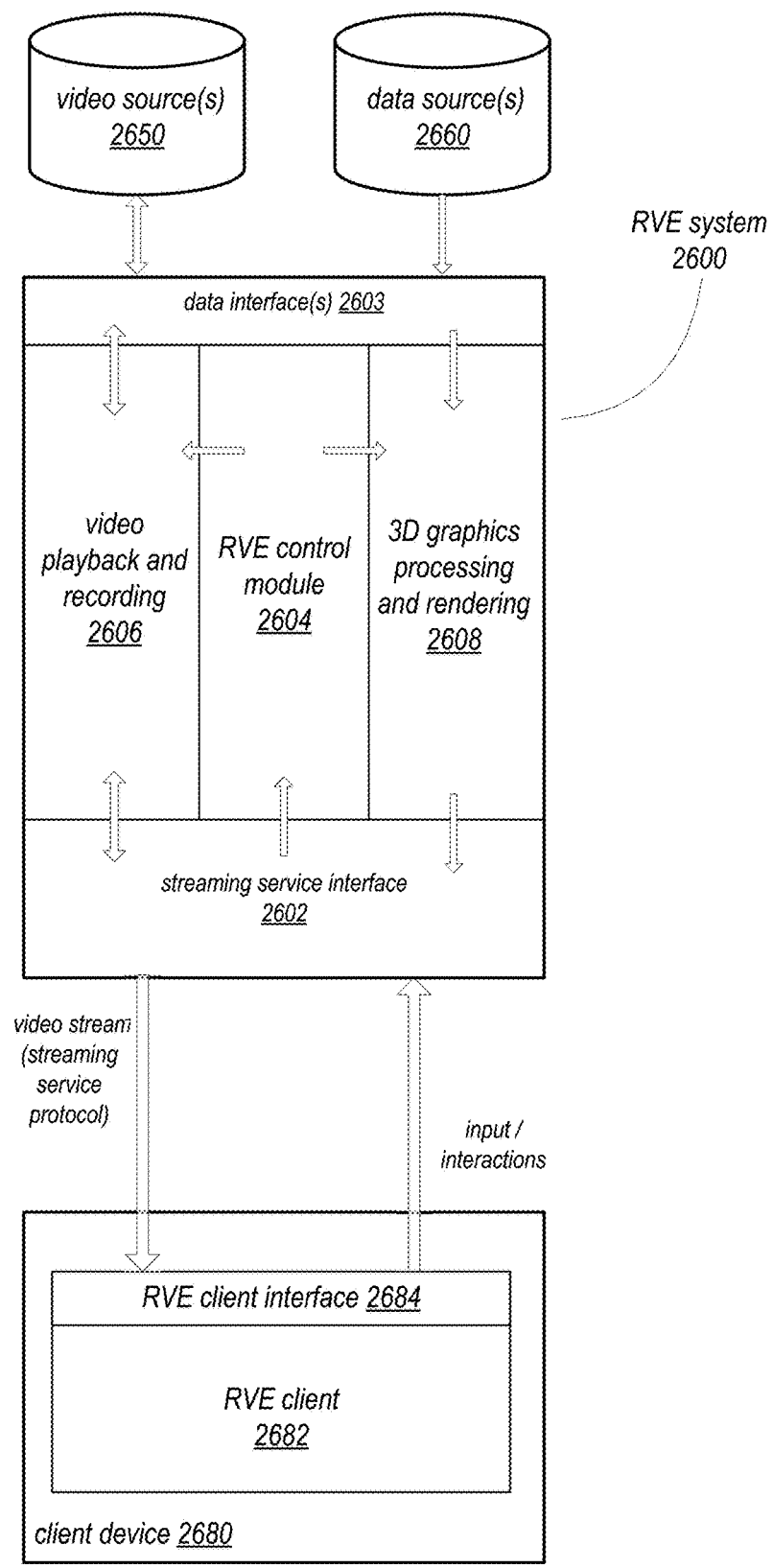
FIG. 14 illustrates an example network-based environment in which a streaming service is used to stream rendered video to clients, according to at least some embodiments.
Figure 15:
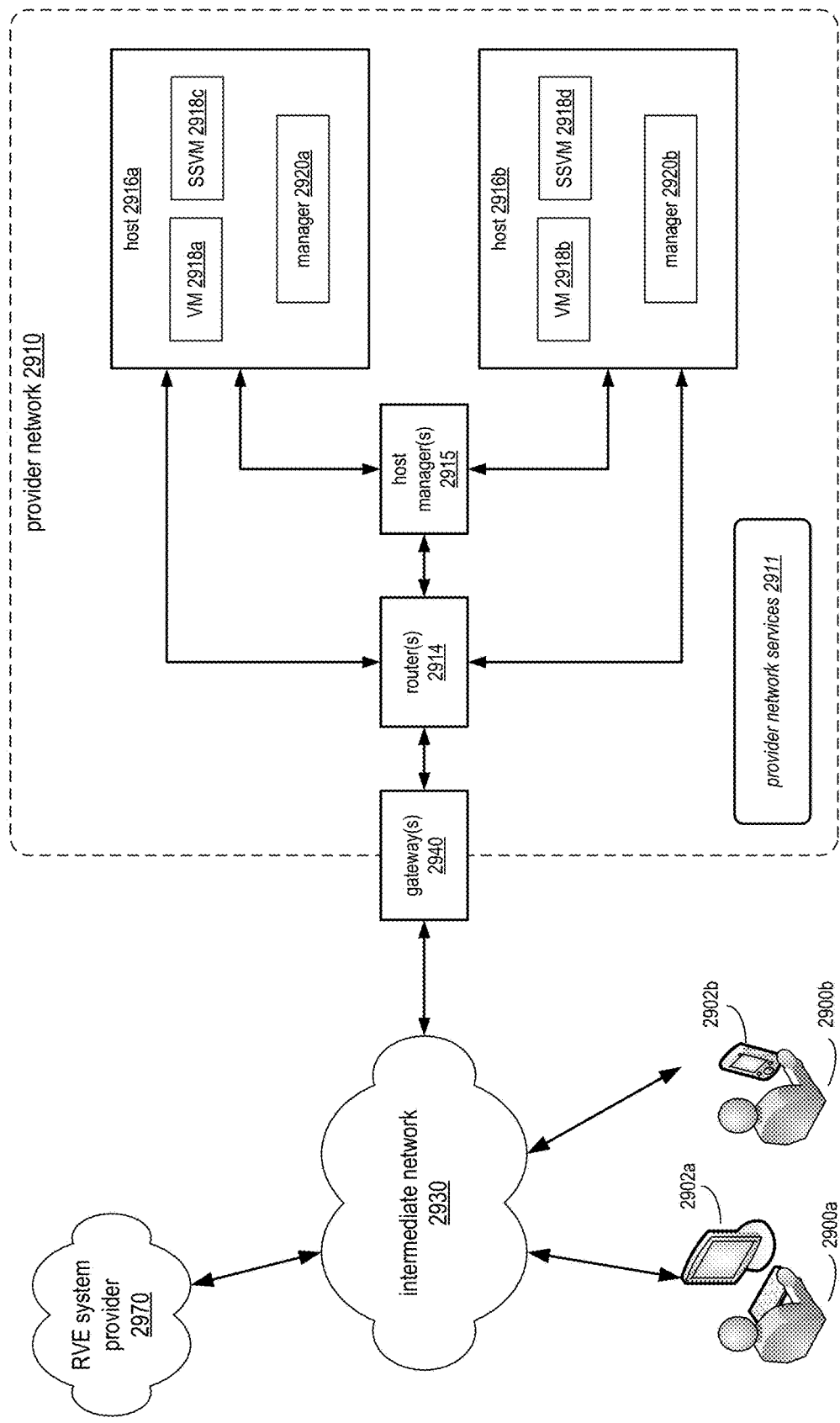
FIG. 15 is a diagram illustrating an example provider network environment in which embodiments as described herein may be implemented.
Figure 16:
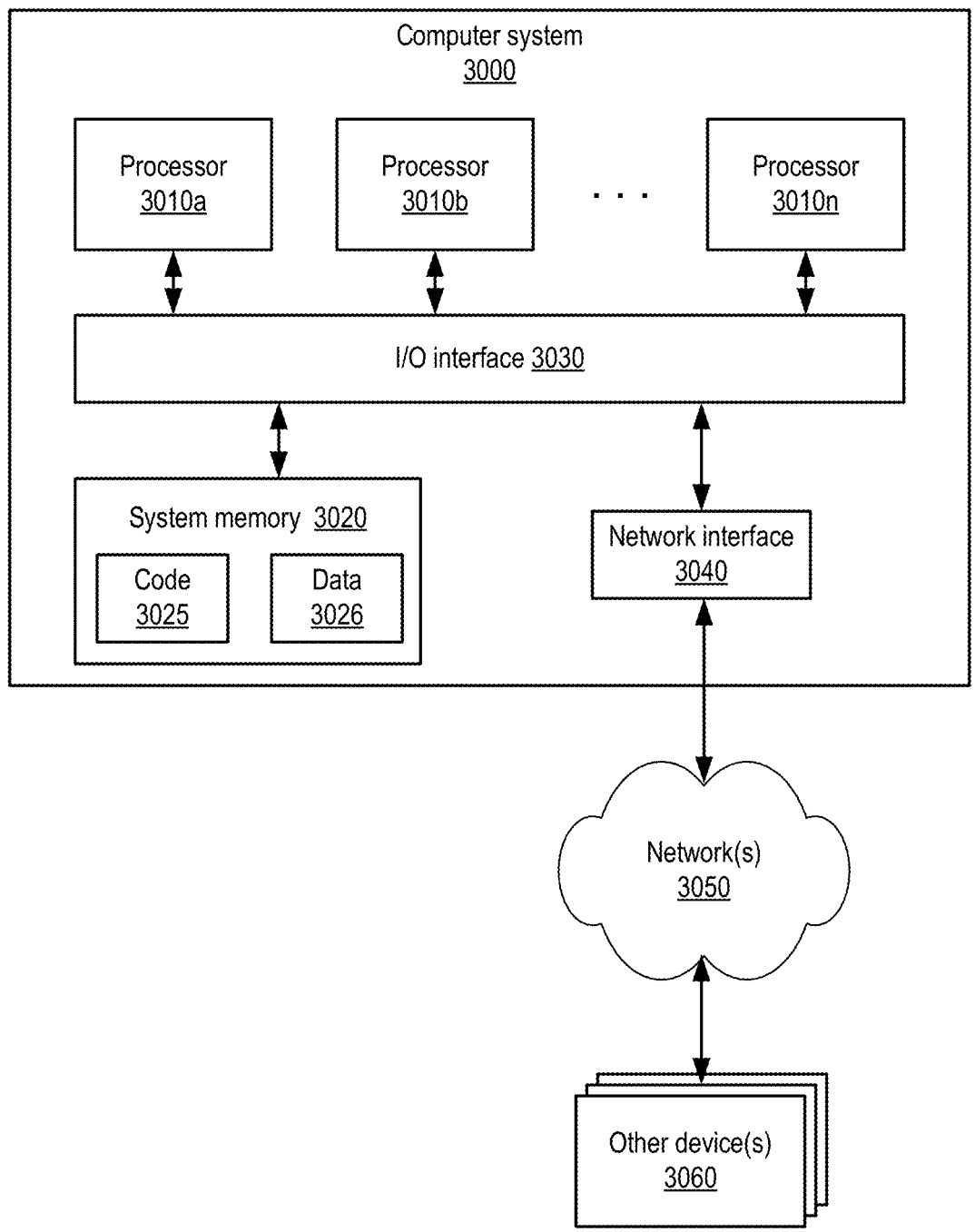
FIG. 16 is a block diagram illustrating an example computer system that may be used in some embodiments.

Since exploring and rendering a 3D world is computationally expensive, at least some embodiments of an RVE system 10 may leverage network-based computation resources and services (e.g., a streaming service) to receive user input/interactions within a scene being explored from an RVE client 30 on a client device, responsively generate or update a 3D model from the 3D data in response to the user input/interactions, render new video content of the scene from the 3D model, and deliver the newly rendered video content (and in some cases also audio) as a video stream to the client device in real-time or near-real-time and with low latency. The computational power available through the network-based computation resources, as well as the video and audio streaming capabilities provided through a streaming protocol, allows the RVE system 10 to provide low-latency responses to the user's interactions with the 3D world as viewed on the respective client device, thus providing a responsive and interactive exploratory experience to the user. FIG. 13 illustrates an example RVE system and environment in which network-based computation resources are leveraged to provide real-time, low-latency rendering and streaming of video content, according to at least some embodiments. FIG. 14 illustrates an example network-based environment in which a streaming service is used to stream rendered video to clients, according to at least some embodiments. FIG. 15 illustrates an example provider network environment in which embodiments of an RVE system as described herein may be implemented. FIG. 16 is a block diagram illustrating an example computer system that may be used in some embodiments.

In addition to allowing users to pause, step into, move through, and explore the 3D modeled worlds of scenes in a video, at least some embodiments of an RVE system 10 may also allow users to modify the scenes, for example by adding, removing, or modifying various graphics effects such as lens effects (e.g., fisheye, zoom, filter, etc.), lighting effects (e.g., illumination, reflection, shadows, etc.), color effects (color palette, color saturation, etc.), or various simulated effects (e.g., rain, fire, smoke, dust, fog, etc.) to the scenes.

In addition to allowing users to pause, step into, move through, explore, and even modify the 3D modeled worlds of scenes in a video, at least some embodiments of an RVE system 10 may also allow users to discover, select, explore, and manipulate objects within the 3D modeled worlds used to generate video content. At least some embodiments of an RVE system 10 may implement methods that allow users to view and explore in more detail the features, components, and/or accessories of selected objects that are being manipulated and explored. At least some embodiments of an RVE system 10 may implement methods that allow users to interact with interfaces of selected objects or interfaces of components of selected objects.

In addition to allowing users to explore scenes and manipulate objects within scenes, at least some embodiments of an RVE system 10 may allow users to interact with selected objects to customize or accessorize the objects. For example, a viewer can manipulate or interact with a selected object to add or remove accessories, customize the object (change color, texture, etc.), or otherwise modify the object according to the user's preferences or desires. In at least some embodiments, the RVE system 10 may provide an interface via which the user can obtain additional information for the object, customize and/or accessorize an object if and as desired, be given a price or price(s) for the object as customized/accessorized, and order or purchase a physical version of the object as specified if desired.

In at least some embodiments, a user may order, purchase, or obtain a virtual representation of the object instead of or in addition to a physical version of the object, if desired. A virtual representation may be any digital representation of a physical product, item, or object. A virtual representation may be any type of digital representation from static or animated 2D or 3D digital images or graphics to complex 2D or 3D models (e.g., computer-aided design (CAD) models, computer-generated imagery (CGI) models, etc.) that may, for example, be instantiated, rendered, and in some cases animated and manipulated within virtual universes by physics engines.

At least some embodiments of an RVE system 10 may allow a user to create and record their own customized version of a video such as a movie, and/or to stream or broadcast a customized version of a video to one or more destinations in real time. Using embodiments, new versions of videos or portions of videos may be generated and may, for example, be stored or recorded to local or remote storage, shown to or shared with friends, or may be otherwise recorded, stored, shared, streamed, broadcast, or distributed assuming the acquisition of appropriate rights and permissions to share, distribute, or broadcast the new video content.

At least some embodiments of an RVE system 10 may leverage network-based computation resources and services to allow multiple users to simultaneously receive, explore, manipulate, and/or customize a pre-recorded video via clients 30. The RVE system 10 may, for example, broadcast a video stream to multiple clients 30, and users corresponding to the clients 30 may each explore, manipulate, and/or customize the video as desired. Thus, at any given time, two or more users may be simultaneously exploring a given scene of a video being played back in real time, or may be simultaneously watching the scene from different perspectives or with different customizations, with the RVE system 10 interactively generating, rendering, and streaming new video to clients 30 corresponding to the users according to the users' particular interactions with the video. Note that the video being played back to the clients 30 may be pre-recorded video or may be new video generated by a user via one of the clients 30 and broadcast "live" to one or more others of the clients 30 via the RVE system 10.

At least some embodiments of an RVE system 10 may leverage network-based computation resources and services, available 3D model data, and available viewer information to dynamically personalize content of, or add personalized content to, video for particular viewers. Using embodiments, video (e.g., a movie) can be pre-recorded, and when played back to viewers, at least some objects in at least some of the scenes of the pre-recorded video may be replaced with objects targeted at particular viewers according to profiles of the viewers. Since the video is being rendered and streamed to different viewers in real-time by the network-based computation resources and services, any given scene of a video being streamed to the viewers may be modified and viewed in many different ways by different viewers based on the particular viewers' profiles.

FIGS. 1B through 12 illustrate embodiments and operations of an RVE system 10 and RVE environment in more detail. FIG. 13 illustrates an example provider network environment in which network-based computation and storage resources are leveraged to implement components or modules of an RVE system 10. FIG. 14 illustrates an example network-based RVE environment in which a streaming service provides an interface for streaming rendered video to clients. FIG. 15 illustrates an example provider network environment in which embodiments of an RVE system 10 may be implemented. FIG. 16 illustrates an example computer system that may be used in embodiments of an RVE system 10. While embodiments of the RVE system 10 are generally described as generating 3D models of scenes and objects and rendering video from the 3D models of scenes and 3D objects using 3D graphics techniques, embodiments may also be applied in generating and rendering 2D models and objects for video using 2D graphics techniques.

Real-time Exploration of Video Content

At least some embodiments of a real-time video exploration (RVE) system 10 may implement methods that allow users to pause, step into, move through, and explore the 3D modeled worlds used to generate video content (e.g., scenes in movies or other video) during playback of a previously recorded video. Leveraging network-based computation resources and services and utilizing the rich 3D content and data that was used to generate and render the original, previously rendered and recorded video, the RVE system 10 may allow a viewer or viewers of a video, for example a movie, to pause and "step into" a 3D rendered scene from the video, move through the scene to change their point of view, and to thus view and explore the scene and objects in the scene from different angles than the pre-determined angles used in generating the original video.

Figure 1B:
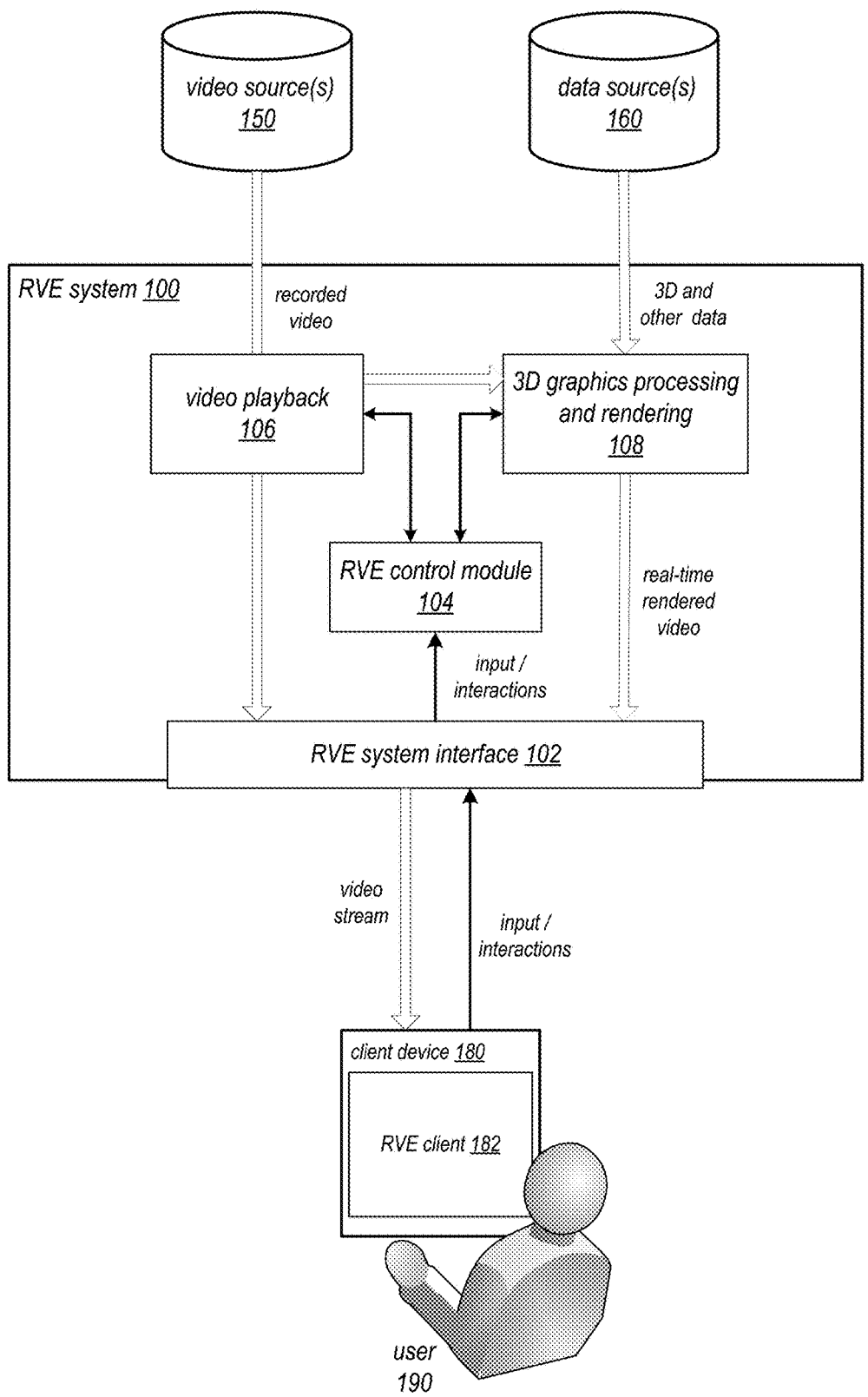
FIG. 1B illustrates an example real-time video exploration (RVE) system and environment in which users can explore modeled worlds rendered in real-time during playback of pre-recorded video, according to at least some embodiments.

FIG. 1B illustrates an example real-time video exploration (RVE) system 100 in an RVE environment in which users can explore 3D modeled worlds rendered in real-time during playback of pre-recorded video, according to at least some embodiments. FIG. 13 illustrates an example provider network environment in which network-based computation and storage resources are leveraged to implement components or modules of RVE system 100. FIG. 14 illustrates an example network-based RVE environment in which a streaming service provides an interface for streaming rendered video to clients. FIG. 15 illustrates an example provider network environment in which embodiments of an RVE system 100 may be implemented. FIG. 16 illustrates an example computer system that may be used in embodiments of an RVE system 100.

In at least some embodiments, an RVE environment as illustrated in FIG. 1B may include an RVE system 100 and one or more client devices 180. The RVE system 100 has access to stores or other sources of pre-rendered, pre-recorded video, shown as video source(s) 150. The video content may include one or more of, but is not limited to movies, shorts, cartoons, commercials, and television and cable programs. The video available from video source(s) 150 may, for example, include fully 3D rendered, animated video content, as well as partially 3D rendered video content that involves filming live action using green- or blue-screen technology and adding background and/or other content or effects using one or more 3D computer graphics techniques.

Note that, in addition to sequences of video frames, a video may typically include other data such as audio tracks and video metadata. For example, in some embodiments, each frame may have or may correspond to a frame tag that includes information about the frame. The video metadata may include, but is not limited to, time stamps for frames and scene information.

In at least some embodiments, the RVE system 100 may also have access to stores or other sources of data and information including but not limited to 3D graphics data, shown as data source(s) 160. The 3D graphics data may include data that was used in generating and rendering scenes for at least some of the pre-recorded video available from video sources 150, and may also include additional 3D graphics data. Data source(s) 160 may also store or otherwise provide other data and information including but not limited to data and information about particular users 190. Non-limiting examples of user data that may be available from data source(s) 160 include RVE system 100 registration information, client device 180 information, name, account number, contact information, billing information, and security information. In some embodiments, data source (s) 160 may also store or otherwise provide information for users including preferences, viewing history, shopping history, sex, age, location, and other demographic and historical information. Note that, while video source(s) 150 and data source(s) 160 are shown as separate sources in FIG. 1B, video and data may be obtained from the same source or sources or from different sources.

In at least some embodiments, the RVE system 100 may include a video playback 106 module or component and an RVE system interface 102. In at least some embodiments, RVE system interface 102 may be or may include one or more application programming interfaces (APIs) for receiving input from and sending output to RVE client(s) 182 on client device(s) 180. In at least some embodiments, in response to user 190 selection of a video for playback, the video playback 106 module may obtain pre-rendered, pre-recorded video from a video source 150, process the video as necessary, and stream the pre-recorded video to the respective client device 180 via RVE system interface 102. Alternatively, the RVE system 100 may begin playback of a pre-recorded video, for example according to a program schedule, and one or more users 190 may choose to view the playback of the video via respective client devices 180.

In at least some embodiments, the RVE system 100 may also include a 3D graphics processing and rendering 108 module or component. Note that in some embodiments, 3D graphics processing and 3D rendering may be implemented as separate components or modules. During an RVE event in which the user 190 pauses a video being played back and steps into a scene, 3D graphics processing and rendering 108 module may obtain 3D data from one or more data sources 160, generate a 3D modeled world for the scene according to the 3D data, render 2D representations of the 3D modeled world from user-controlled camera viewpoints, and stream the real-time rendered video to the respective client device 180 via RVE system interface 102.

In at least some embodiments, the RVE system 100 may also include an RVE control module 104 that receives input and interactions from an RVE client 182 on a respective client device 180 via RVE system interface 102, processes the input and interactions, and directs operations of video playback module 106 and 3D graphics processing and rendering 108 module accordingly. In at least some embodiments, the input and interactions may be received according to an API provided by RVE system interface 102. RVE control module 104 may also track operations of video playback module 106 and 3D graphics processing and rendering 108 module. For example, RVE control module 104 may track playback of a given video through video playback 106 module so that the RVE control module 104 can determine which scene is currently being played back to a given client device 180.

In at least some embodiments, RVE system 100 may be implemented by or on one or more computing devices, for example one or more server devices or host devices, that implement the modules or components 102, 104, 106, and 108, and may also include one or more other devices including but not limited to storage devices that store pre-recorded video, 3D graphics data, and/or other data and information that may be used by RVE system 100. FIG. 16 illustrates an example computer system that may be used in some embodiments of an RVE system 100. In some embodiments, the computing devices and storage devices may be implemented as network-based computation and storage resources, for example as illustrated in FIG. 13.

However, in some embodiments, functionality and components of RVE system 100 may be implemented at least in part on one or more of the client devices 180. For example, in some embodiments, at least some client devices 180 may include a rendering component or module that may perform at least some rendering of video data streamed to the client devices 180 from RVE system 100. Further, in some embodiments, instead of an RVE system implemented according to a client-server model or variation thereof in which one or more devices such as servers host most or all of the functionality of the RVE system, an RVE system may be implemented according to a distributed or peer-to-peer architecture. For example, in a peer-to-peer architecture, at least some of the functionality and components of an RVE system 100 as shown in FIG. 1B may be distributed among one, two, or more devices 180 that collectively participate in a peer-to-peer relationship to implement and perform real-time video exploration methods as described herein.

While FIG. 1B shows a single client device 180 and client 190 interacting with RVE system 100, in at least some embodiments RVE system 100 may support many client devices 180. For example, in at least some embodiments, the RVE system 100 may be a network-based video playback and exploration system that leverages network-based computation and storage resources to support tens, hundreds, thousands, or even more client devices 180, with many videos being played back and/or explored by different users 190 via different client devices 180 at the same time. In at least some embodiments, the RVE system 100 may be implemented according to a service provider's provider network environment, for example as illustrated in FIGS. 13 and 15, that may implement one or more services that can be leveraged to dynamically and flexibly provide network-based computation and/or storage resources to support fluctuations in demand from the user base. In at least some embodiments, to support increased demand, additional computation and/or storage resources to implement additional instances of one or more of the modules of the RVE system 100 (e.g., 3D graphics processing and rendering module 108, video playback 106 module, RVE control 104 module, etc.) or other components not shown (e.g., load balancers, routers, etc.) may be allocated, configured, "spun up", and brought on line. When demand decreases, resources that are no longer needed can be "spun down" and deallocated. Thus, an entity that implements an RVE system 100 on a service provider's provider network environment, for example as illustrated in FIGS. 13 and 15, may only have to pay for use of resources that are needed, and only when they are needed.

Figure 1C:
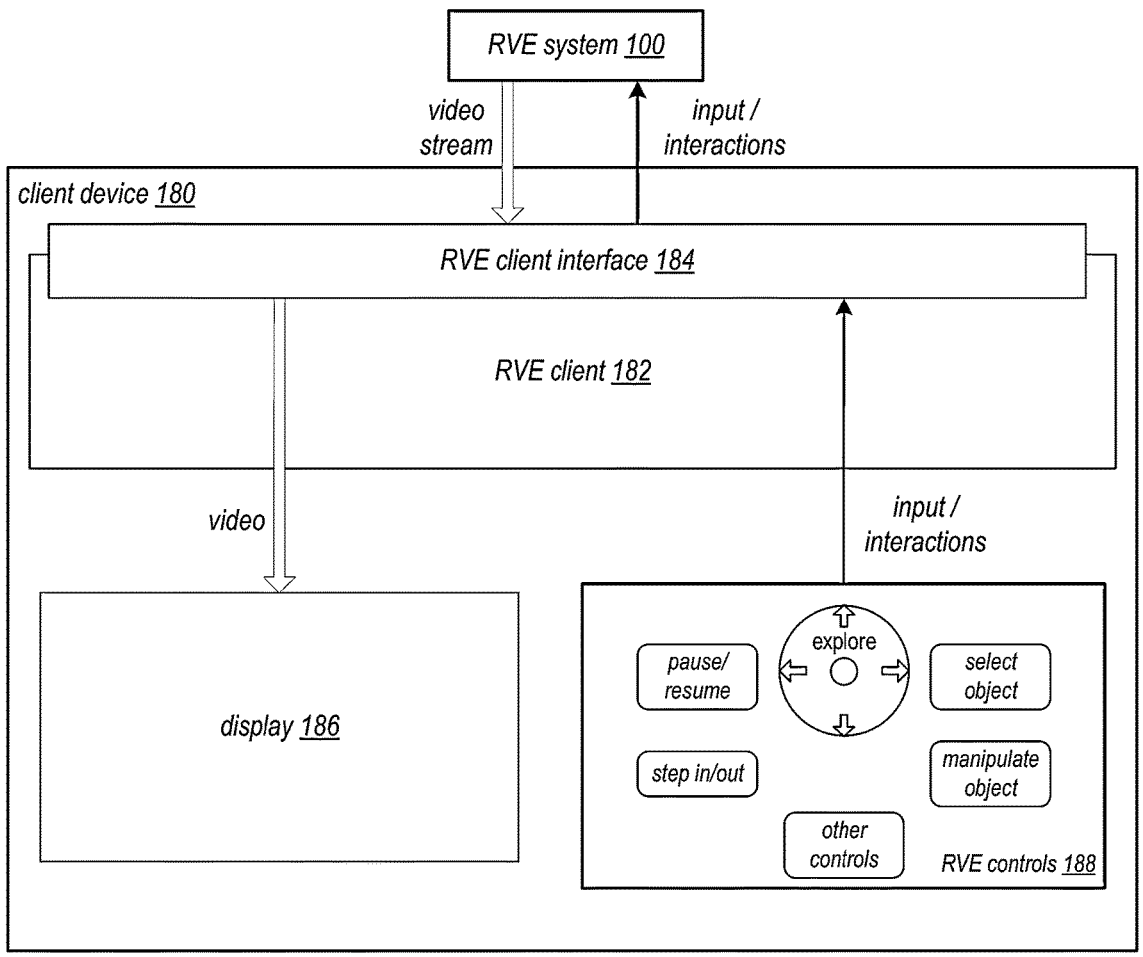
FIG. 1C illustrates an example RVE client system, according to at least some embodiments.

FIG. 1C illustrates an example RVE client system, according to at least some embodiments. An RVE client system may include a client device 180 that implements an RVE client 182. The RVE client 182 may implement an RVE client interface 184 via which the RVE client 182 on device may communicate with an RVE system interface 102 of RVE system 100, for example according to an API or APIs provided by RVE system interface 102. The RVE client 182 may receive video stream input from RVE system 100 via RVE client interface 184 and send the video to a display 186 component of client device 180 to be displayed for viewing. The RVE client 182 may receive input/interactions from an RVE controls 188 component and communicate at least some of the input/interactions to RVE system 100 via RVE client interface 184.

A client device 180 may be any of a variety of devices (or combinations of devices) that can receive, process, and display video input according to an RVE client 182 implementation on the device. A client device 180 may include, but is not limited to, input and output components and software (RVE client 182 and interface 184) via which users 190 can interface with the RVE system 100 to play back video and to explore scenes in the video in real-time as described herein. A client device 180 may implement an operating system (OS) platform that is compatible with the device 180. The RVE client 182 and interface 184 on a particular client device 180 may be tailored to support the configuration and capabilities of the particular device 180 and the OS platform of the device 180. Examples of client devices 180 may include, but are not limited to, set-top boxes coupled to video monitors or televisions, cable boxes, desktop computer systems, laptop/notebook computer systems, pad/tablet devices, smartphone devices, game consoles, and handheld or wearable video viewing devices. Wearable devices may include, but are not limited to, glasses or goggles and "watches" or the like that are wearable on the wrist, arm, or elsewhere. An example computing device that may be used as a client device 180 is illustrated in FIG. 16. Examples of RVE client systems and devices 180 are graphically illustrated in FIGS. 7A through 12.

In addition to the ability to receive and display video input, a client device 180 may include one or more integrated or external control devices and/or interfaces that may implement RVE controls 188. Examples of control devices that may be used include, but are not limited to, conventional cursor control devices such as keyboards and mice, touch-enabled display screens or pads, game controllers, remote control units or "remotes" such as those that commonly come with consumer devices, and "universal" remote control devices that can be programmed to operate with different consumer devices. In addition, some implementations may include voice-activated interface and control technology. Example RVE control interfaces may include, but are not limited to, control bars or control windows that may be shown/hidden at the bottom of (or elsewhere on) a video display, and that may be interacted with via touch devices, cursor control devices, or remote control devices. Note, however, that in some implementations touch gesture input to a video displayed on a touch-enabled device may be used as RVE controls. Example RVE controls 188 that may be implemented on or by a control device and/or control interface may include one or more of, but are not limited to: pause/resume control(s) for pausing and resuming video playback; step in/out control(s) for stepping into or out of a particular scene; "explore" controls for moving the user's viewpoint or "camera" around (e.g., backwards, forwards, up, down, left right) in a scene, changing the angle of the user's viewpoint, and so on; one or more controls for selecting objects in the scene, and for manipulating objects in the scene in one or more ways; and in general any other controls that may be used in controlling video playback and exploring, interacting with, modifying, and manipulating video content including objects in a scene.

Note that, in FIGS. 1A and 1B and elsewhere in this document, the terms "user", "viewer", or "consumer" are generally used to refer to an actual human that participates in an RVE system environment via a client device to play back and explore videos as described herein, while the term "client" (as in "client device" and "RVE client") is generally used to refer to a hardware and/or software interface via which the user or viewer interacts with the RVE system to play back and explore videos as described herein.

As an example of operations of an RVE system 100 as illustrated in FIGS. 1A and 1B, RVE control module 104 may direct video playback module 106 to begin playback of a selected video or portion thereof from a video source 150 to a respective client device 180 in response to input received from the client device 180. During playback of the video to the client device 180, additional input and interactions received by RVE control module 104 from the RVE client 182 on the client device 180 may indicate an RVE event in which the user 190 pauses the video being played back to the client device 180 and steps into a scene. In response, the RVE control module 104 may direct video playback 106 module to pause playback of the pre-recorded video from video source(s) 150, and direct 3D graphics processing and rendering 108 module to begin generating a 3D modeled world for the scene according to 3D data for the scene obtained from data source(s) 160, rendering a 2D representations of the 3D modeled world, and streaming the real-time rendered video to the respective client device 180. In response to additional user input and interactions received from RVE client 182 indicating that the user is exploring the scene, the RVE control module 104 may direct 3D graphics processing and rendering 108 module to render and stream new video of the scene from the 3D modeled world according to the 3D data for the scene and current user input, for example new video rendered from a particular position and angle within the 3D modeled world of the scene that is indicated by the user's current input to RVE client 182. In response to resume input received from RVE client 182, the RVE control module 104 may direct 3D graphics processing and rendering 108 module to stop generating and streaming new exploratory video of the scene, and direct video playback 106 module to resume playback of the pre-recorded video from video source(s) 150.

Figure 2:
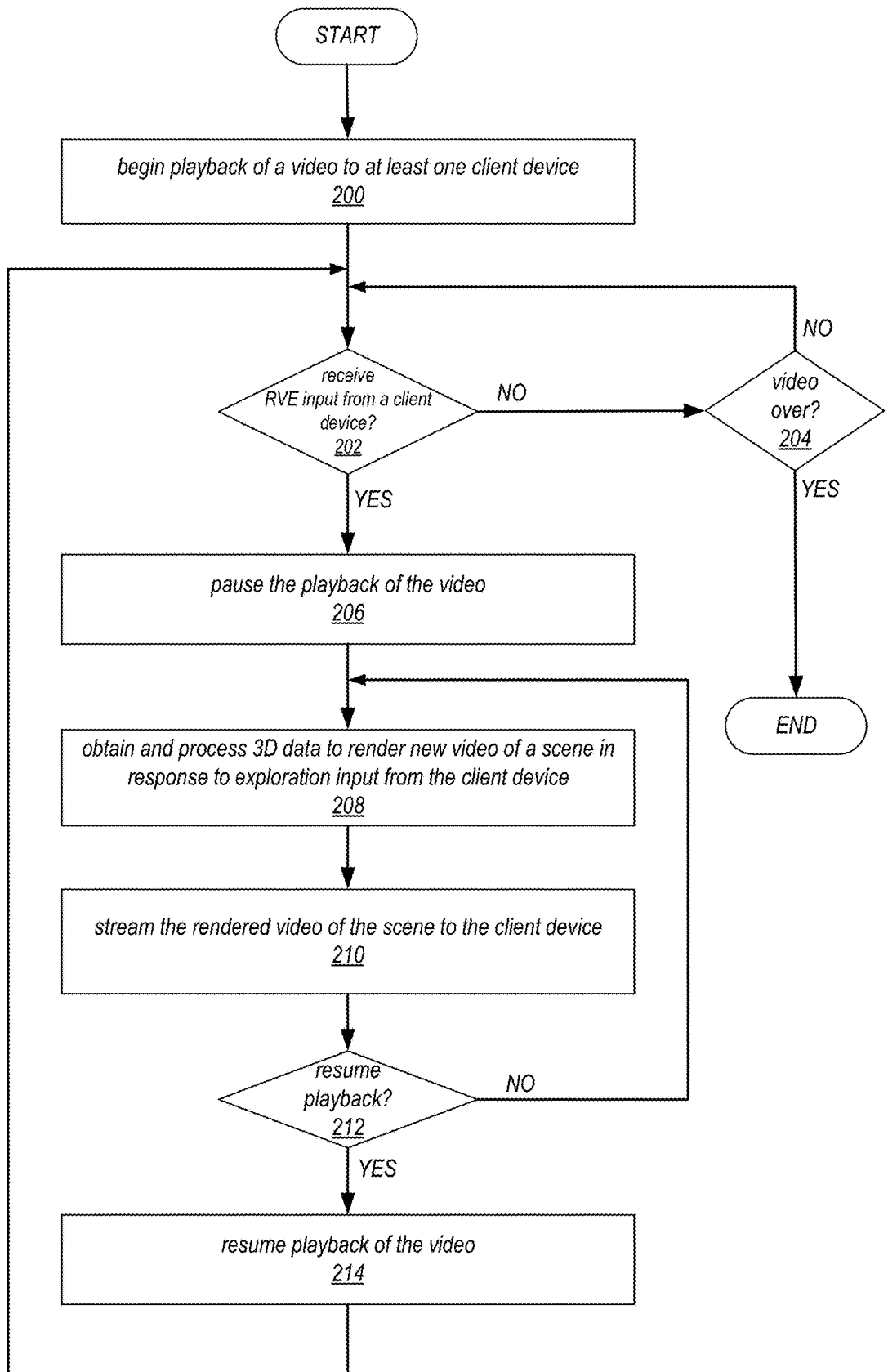
FIG. 2 is a flowchart of a method for exploring modeled worlds in real-time during playback of pre-recorded video, according to at least some embodiments.

FIG. 2 is a flowchart of a method for exploring 3D modeled worlds in real-time during playback of pre-recorded video according to at least some embodiments, and with reference to FIGS. 1A and 1B. As indicated at 200, an RVE system 100 may begin playback of a pre-recorded video to at least one client device 180. For example, an RVE control module 104 of the RVE system 100 may direct a video playback module 106 to begin playback of a selected video from a video source 150 to a client device 180 in response to selection input received from the client device 180. Alternatively, the RVE system 100 may begin playback of a pre-recorded video from a video source 150, and then receive input from one or more client devices 180 joining the playback to view (and possibly explore) the video content.

During playback of the pre-recorded video to the client device 180, additional input and interactions may be received by the RVE system 100 from an RVE client 182 on a client device 180. For example input may be received that indicates an RVE event in which the user 190 pauses the pre-recorded video being played back to the client device 180 so that the user 190 can explore the current scene. As indicated at 202, the RVE system 100 may continue to play back the pre-recorded video to the client device 180 until the video is over as indicated at 204, or until RVE input is received from the client device 180 that directs the RVE system 100 to pause the video. At 202, if RVE input requesting a pause of the video is received from a client device 180, the RVE system 100 pauses the replay of the video to the client device 180 at a current scene, as indicated at 206.

As indicated at 208, while the playback of the pre-recorded video is paused at a scene, the RVE system 100 may obtain and process 3D data to render new video of the scene in response to exploration input from the client device 180, and may stream the newly rendered video of the scene to the client device as indicated at 210. In at least some embodiments, the RVE system 100 may begin generating a 3D modeled world for the scene from the 3D data, rendering a 2D representations of the 3D modeled world, and streaming the real-time rendered video to the respective client device 180 in response to the pause event as indicated at 202 and 206. Alternatively, the RVE system 100 may begin generating a 3D modeled world for the scene from the 3D data, rendering a 2D representations of the 3D modeled world, and streaming the real-time rendered video to the respective client device 180 upon receiving additional exploratory input received from the client device 180, for example input changing the viewing angle of the viewer in the scene, or input moving the viewer's viewpoint through the scene. In response to additional user input and interactions received from the client device 180 indicating that the user is further exploring the scene, the RVE system 100 may render and stream new video of the scene from the 3D modeled world according to the current user input and 3D data, for example new video rendered from a particular position and angle within the 3D modeled world of the scene that is indicated by the user's current input to the client device 180. Alternatively, in some embodiments, the video may not be paused at 206, and the method may perform elements 208 and 210 while the video continues playback.

In at least some embodiments, in addition to allowing users to pause, step into, move through, and explore a scene in a pre-recorded video being played back, the RVE system 100 may allow a user to modify the scene, for example by adding, removing, or modifying graphics effects such as lens effects (e.g., fisheye, zoom, etc.), lighting effects (e.g., illumination, reflection, shadows, etc.), color effects (color palette, color saturation, etc.), or various simulated effects (e.g., rain, fire, smoke, dust, fog, etc.) to the scenes.

As indicated at 212, the RVE system 100 may continue to render and stream new video of the scene from the 3D modeled world in response to exploratory input until input is received from the client device indicating that the user wants to resume playback of the pre-recorded video. As indicated at 214, upon receiving resume playback input, the RVE system may resume playing back the pre-recorded video to the client device 180. The playback may, but does not necessarily, resume at the point where the playback was paused at 206.

Figure 7A:
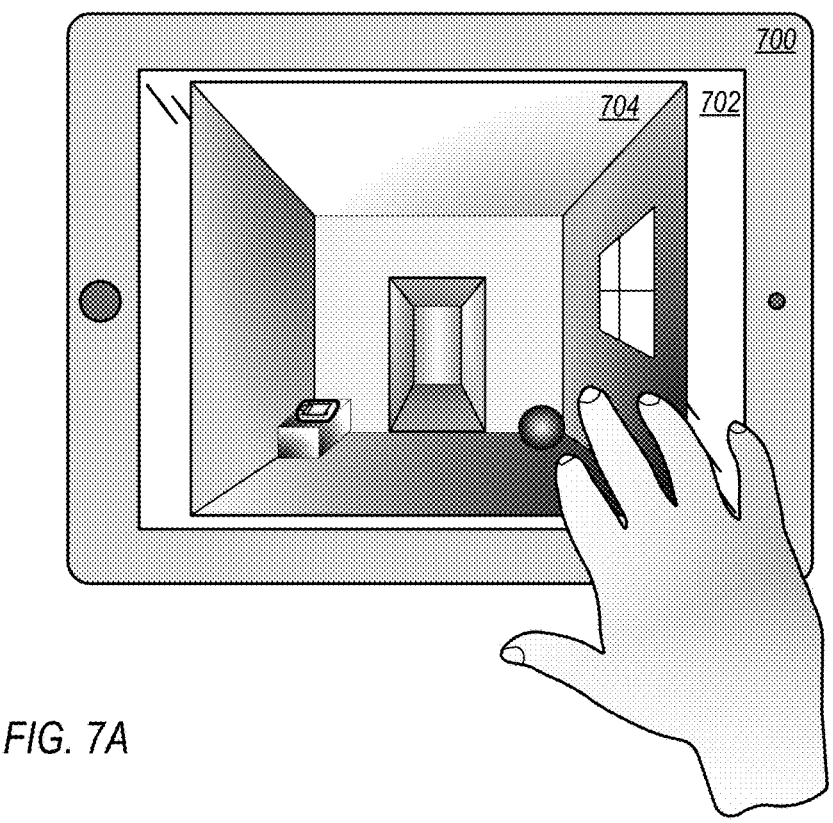
FIGS. 7A through 7C graphically illustrate exploring a rendered 3D model of a scene while a pre-recorded video is paused, according to at least some embodiments.
Figure 7B:
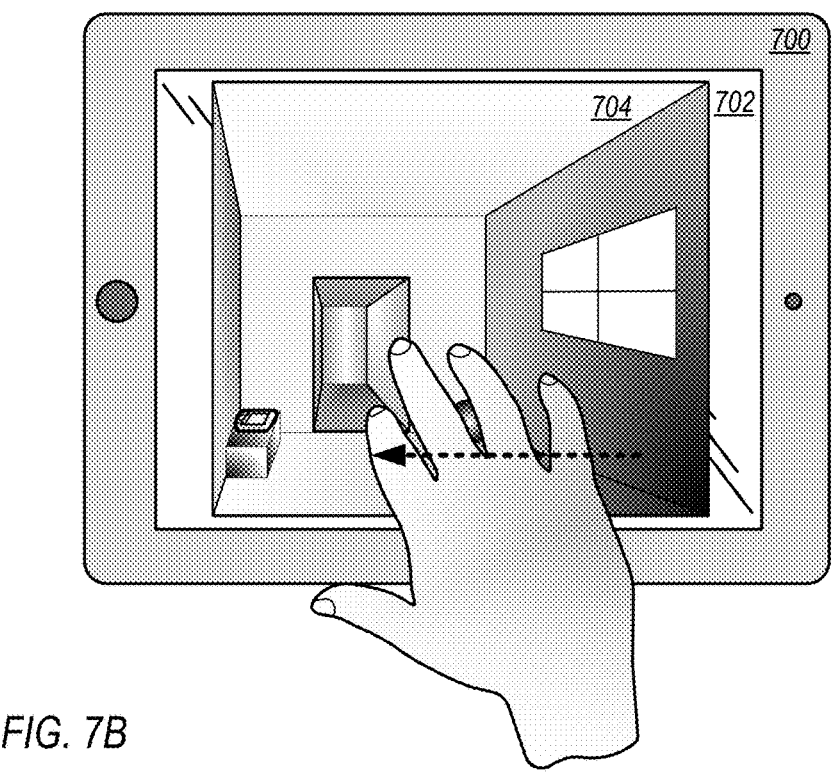
Figure 7C:
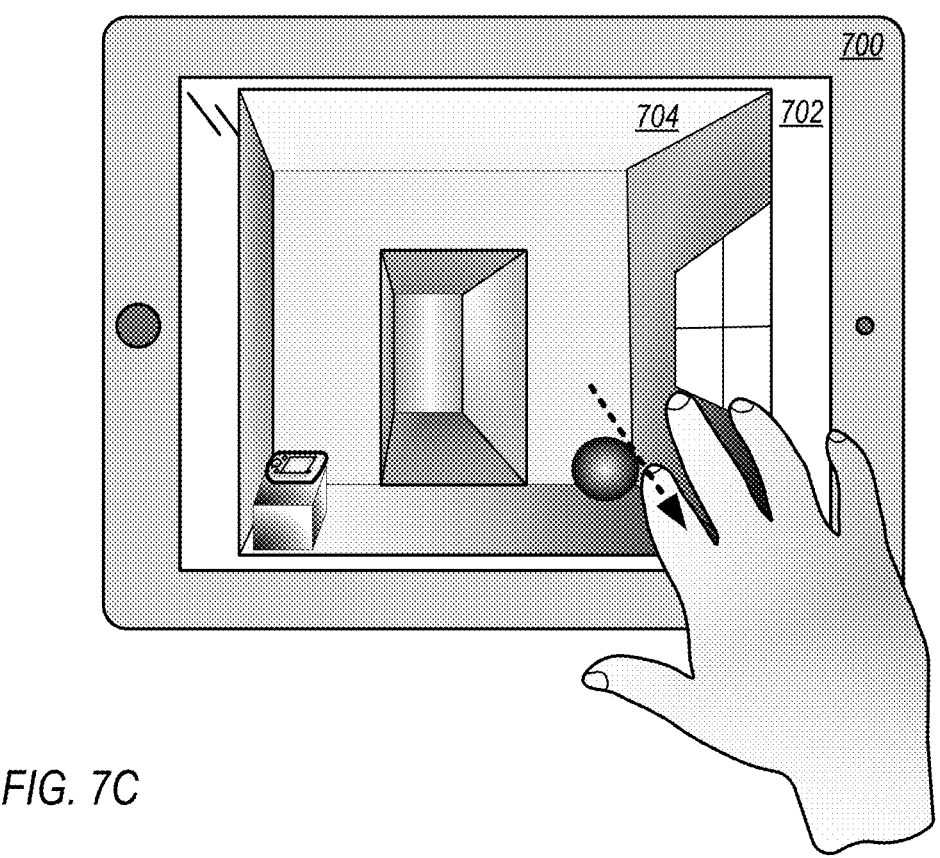

FIGS. 7A through 7C graphically illustrate exploring a rendered 3D model of a scene while a pre-recorded video is paused, according to at least some embodiments. These Figures show, as an example of a client device 180, a touch-enabled consumer device 700, such as a tablet or smartphone device. The device 700 includes a touch-enabled display screen 702 to which a rendered scene 704 may be displayed. Initially, scene 704 may be displayed from a pre-recorded video being played back to device 700 from an RVE system 100. In FIG. 7A, the user may interact with an RVE control method implemented by the RVE client on device 700 to pause the video at scene 704. For example, a control window may be displayed, and the user may select a "pause" interface element from the window. Alternatively, a touch gesture may be used to pause the video at the scene 704. For example, a double tap on the video display may pause the video at the scene. Other methods may be used to pause a video in various embodiments. Alternatively, in some embodiments, the video may not be paused, and the methods may be performed while the video continues playback.

In FIG. 7B, the user changes the current viewing angle to view the scene 704 from a slightly different angle. In this example, the user uses a right-to-left swipe gesture on the touch-enabled screen to change the viewing angle. However, note that other touch gestures or interface methods may be used to change the viewing angle in various embodiments or client implementations. In response to the user's input, the RVE system may render new video of the scene from the changed viewing angle and stream the newly rendered video of the scene to the device 700 for display. In FIG. 7C, the user changes the position of the current viewpoint to move within the scene 704. In this example, the user uses a downward swipe gesture on the touch-enabled screen to move forward in the scene 704. However, note that other touch gestures or interface methods may be used to move within a scene in various embodiments or client implementations. In response to the user's input, the RVE system may render new video of the scene from the new positions and stream the newly rendered video of the scene to the device 700 for display.

In at least some embodiments, the RVE system 100 may leverage network-based computation resources and services (e.g., a streaming service) to receive the user input/interactions from within scene 704 on device 700, responsively generate or update a 3D model from the 3D data in response to the user input/interactions, render the new video content of the scene from the 3D model, and deliver the newly rendered video content (and possibly also audio) to the device 700 in real-time or near-real-time as a video stream. The computational power available through the network-based computation resources, as well as the video and audio streaming capabilities provided through a streaming protocol, may allow the RVE system 100 to provide low-latency responses to the user's interactions with the 3D world of the scene 704 as viewed on the device 700, thus providing a responsive and interactive exploratory experience to the user.

Real-time Object Manipulation in Video Content

At least some embodiments of a real-time video exploration (RVE) system 10 such as RVE system 100 shown in FIG. 1B may implement methods that allow users to discover, select, explore, and manipulate objects within the 3D modeled worlds used to generate video content (e.g., scenes in movies or other video). Leveraging network-based computation resources and services and utilizing the rich 3D content and data that was used to generate and render the original, previously rendered and recorded video, an RVE system 100 may allow a viewer of a video, for example a movie, to pause and "step into" a 3D rendered scene from the video via a client device, for example a device 180 as illustrated in FIG. 1C, to discover, select, explore, and manipulate objects within the scene. For example, a viewer can pause a movie at a scene and interact with one or more 3D-rendered object(s) in a scene. The viewer may select a 3D model of an object in the scene, pull up information on or relevant to the selected object, visually explore the object, and in general manipulate the object in various ways.

Figure 3:
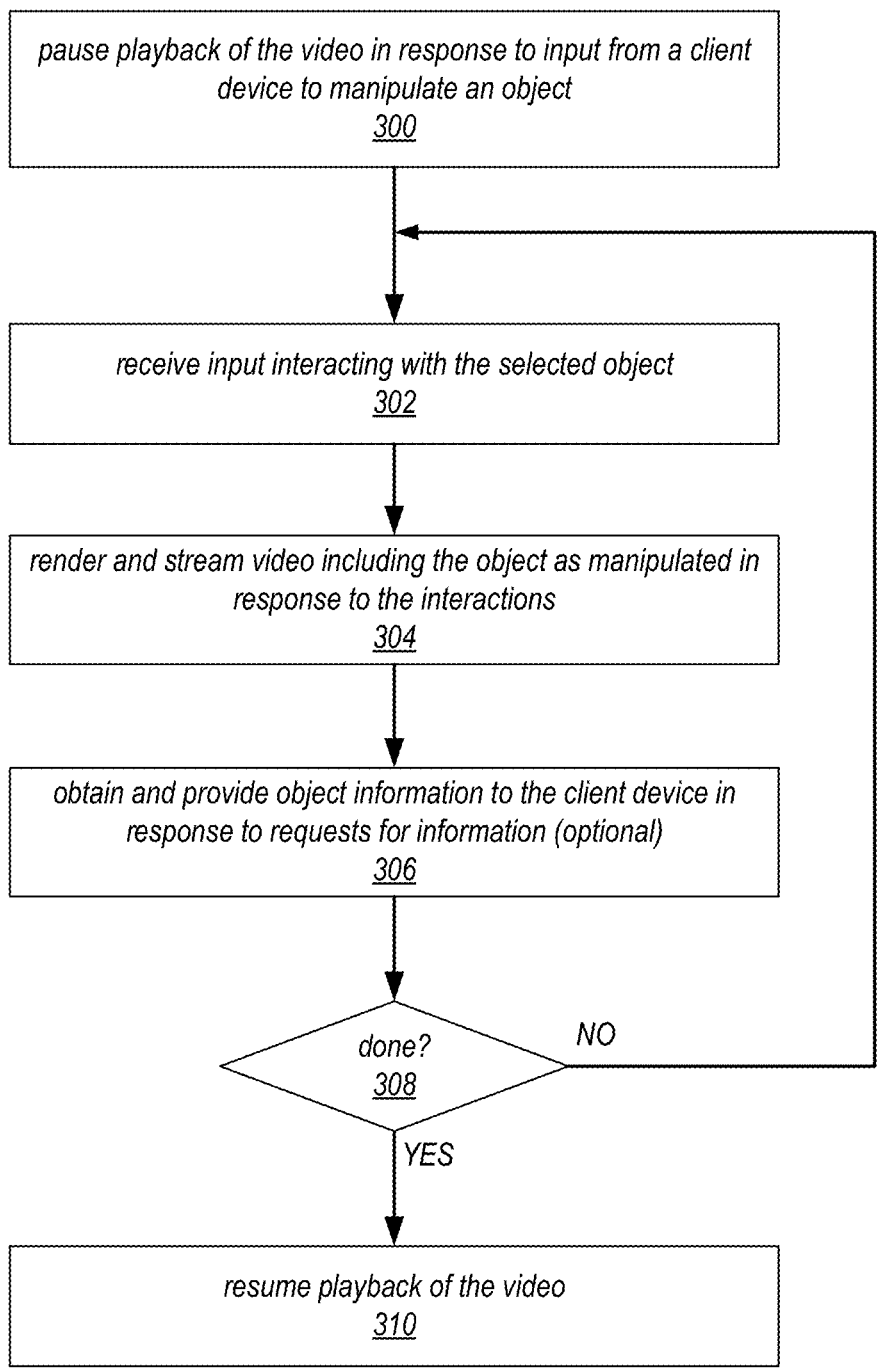
FIG. 3 is a flowchart of a method for interacting with objects and rendering new video content of the manipulated objects while exploring a video being played back, according to at least some embodiments.

FIG. 3 is a flowchart of a method for interacting with objects and rendering new video content of the manipulated objects while exploring a pre-recorded video being played back, according to at least some embodiments, and with reference to FIGS. 1A and 1B. As indicated at 300, the RVE system 100 may pause playback of a pre-recorded video being played back to a client device 180 in response to input received from the client device 180 to manipulate an object in a scene. In at least some embodiments, the RVE system 100 may receive input from the client device 180 selecting an object in a scene displayed on the device 180. In response, the RVE system 100 may pause the pre-recorded video being played back, obtain 3D data for the selected object, generate a 3D modeled world for the scene including a new 3D model of the object according to the obtained data, and render and stream new video of the scene to the client device 180.

As indicated at 302, the RVE system 100 may receive input from the client device 180 indicating that the user is interacting with the selected object via the device 180. As indicated at 304, in response to the interactive input, the RVE system 100 may render and stream new video of the scene from the 3D modeled world including the 3D model of the object as manipulated or changed by the interactive input to the client device 180.

As indicated at 306, optionally, the RVE system 100 may obtain and provide information for a selected object to the client device 180 in response to a request for information. For example, in some embodiments, a user may double-tap on, right-click on, or otherwise select, an object to display a window of information about the object. As another example, in some embodiments, a user may double-tap on, or right-click on, a selected object to bring up a menu of object options, and select a "display info" option from the menu to obtain the object information.

As indicated at 308, the RVE system 100 may continue to render and stream new video of the scene in response to interactive input with object(s) in the scene. In at least some embodiments, the RVE system 100 may continue to render and stream new video of the scene until input is received from the client device indicating that the user wants to resume playback of the pre-recorded video. As indicated at 310, upon receiving resume playback input, the RVE system may resume playing back the pre-recorded video to the client device 180. The playback may, but does not necessarily, resume at the point where the playback was paused at 300.

Figure 8A:
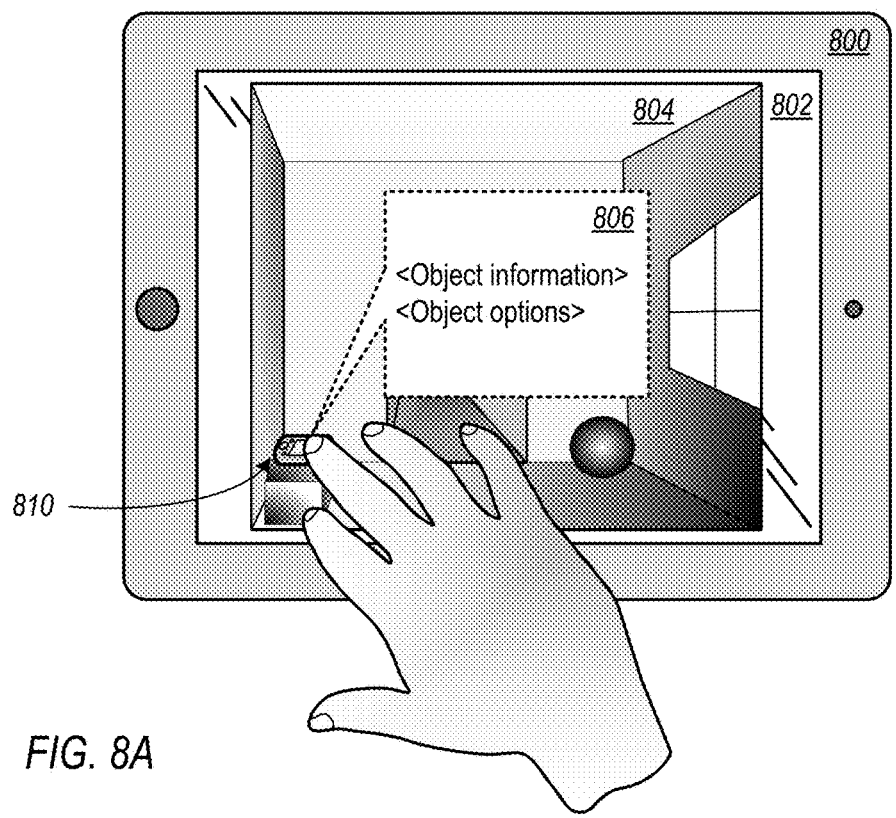
FIG. 8A graphically illustrates selecting an object and obtaining information about the object while exploring a rendered model of a scene, according to at least some embodiments.
Figure 8B:
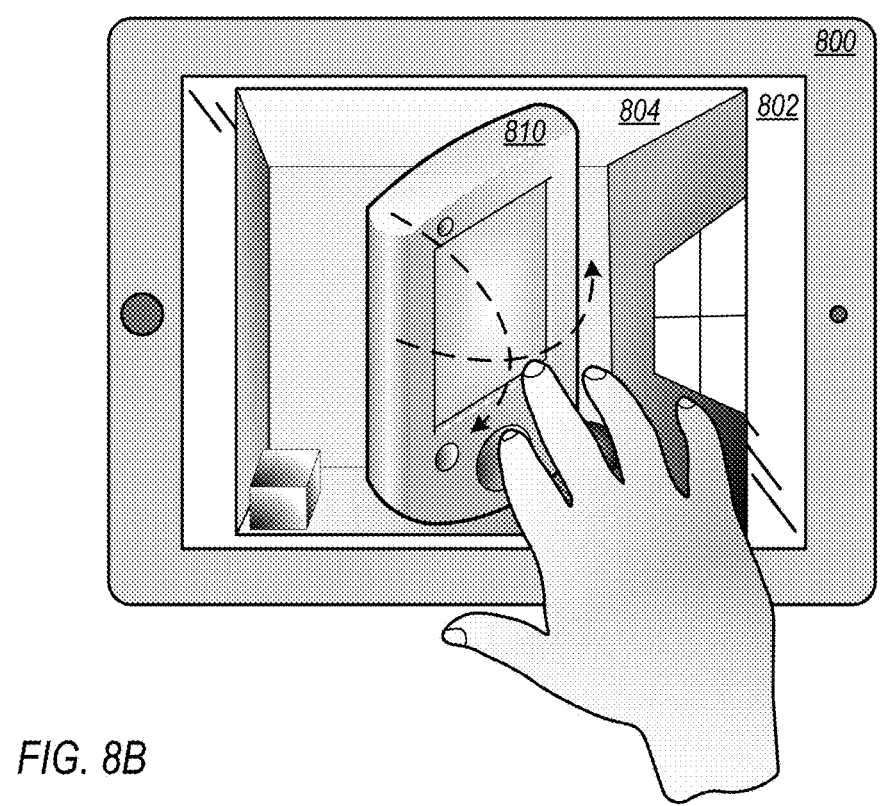
FIG. 8B graphically illustrates manipulating a rendering of a selected object while exploring a rendered model of a scene, according to at least some embodiments.

FIGS. 8A and 8B graphically illustrate selecting and interacting with objects in a scene when exploring a rendered 3D model of the scene, according to at least some embodiments. FIG. 8A graphically illustrates selecting an object and obtaining information about the object while exploring a rendered 3D model of a scene, according to at least some embodiments. FIG. 8B graphically illustrates manipulating a rendering of a selected object while exploring a rendered 3D model of a scene, according to at least some embodiments. These Figures show, as an example of a client device 180, a touch-enabled consumer device 800, such as a tablet or smartphone device. The device 800 includes a touch-enabled display screen 802 to which a rendered scene 804 may be displayed. Initially, scene 804 may be displayed from a pre-recorded video being played back to device 800 from an RVE system 100. The user may interact with an RVE control method implemented by the RVE client on device 800 to pause the video at a scene 804. For example, a control window may be displayed, and the user may select a "pause" interface element from the window. Alternatively, a touch gesture may be used to pause the video at the scene 804. For example, a double tap on the video display may pause the video at the scene. Other methods may be used to pause a video in various embodiments. Note that, in some embodiments, a touch gesture with the screen 802 selecting an object in the scene 804 while the pre-recorded video is still being streamed may also cause the RVE system 100 to pause the video.

In FIG. 8A, the user has selected an object 810 in the scene 804, and the scene 804 is paused. In this example, the selected object 810 is a consumer electronic device such as a smartphone, PDA, or tablet device. However, note that the object 810 may be virtually anything that can be rendered from a 3D model. Non-limiting examples of objects that can be modeled within scenes, selected, and manipulated by embodiments include fictional or real devices or objects such as vehicles (cars, trucks, motorcycles, bicycles etc.), computing devices (smartphones tablet devices, laptop or notebook computers, etc.), entertainment devices (televisions and stereo components, game consoles, etc.), toys, sports equipment, books, magazines, CDs/albums, artwork (painting, sculptures, etc.) appliances, tools, clothes, and furniture; fictional or real plants and animals; fictional or real persons or characters; packaged or prepared foods, groceries, consumables, beverages, and so on; health care items (medicines, soap, shampoo, toothbrushes, toothpaste, etc.); and in general any living or non-living, manufactured or natural, real or fictional object, thing, or entity.

Still referring to FIG. 8A, optionally, the user may interact with the object 810 to obtain more information about the object 810. The RVE system 100 may obtain and provide information for the selected object 810 to the client device 800 in response to the request for information. For example, in some embodiments, the user may double-tap on, or otherwise select, the object 810 to display a window 806 of information about the object. As another example, in some embodiments, a user may double-tap on a selected object 806 to bring up a menu of object options, and select a "display info" option from the menu to obtain the object information Non-limiting examples of information on or relevant to a selected object that may be provided for a selected object 810 may include descriptive information associated and possibly stored with the 3D model data or with the video being played back. In addition, the information may include, or may include links to, informational or descriptive web pages, advertisements, manufacturer or dealer web sites, reviews, BLOGs, fan sites, and so on. In general, the information that may be made available for a given object may include any relevant information that is stored with the 3D model data for the object or with the video, and/or relevant information from various other sources such as web pages or web sites. Note that an "object options" display as shown in FIG. 8A may include various options for manipulating a selected object 810, for example options to change color, texture, or other rendered features of the selected object 810. At least some of these options may be specific to the type of object.

Referring to FIG. 8B, the user may interact with the selected object 810 as displayed on screen 802 using one or more user interface techniques (e.g., touch gesture techniques) to manipulate the object in various ways. For example, as shown in FIG. 8B, the user may use a touch gesture or other interface method to pick up and/or move the object 810, rotate the object on one or more axes, and so on. Non-limiting examples of manipulations of a selected object 810 may include picking up an object, moving an object in the scene, rotating an object as if the object was held in the viewer's hands, manipulating movable parts of the object, or in general any physical manipulation of the object that can be simulated via 3D rendering techniques. Other examples of manipulations of an object may include changing the rendering of an object such as changing the lighting, texture, and/or color of the object, changing the opacity of the object so that the object is somewhat transparent, and so on. Other examples of object manipulations may include opening and closing doors in a house or on a vehicle, opening and closing drawers on furniture, opening and closing the, trunk, or other compartments on a vehicle, or in general any physical manipulation of components of an object that can be simulated via 3D rendering techniques. As just one non-limiting example, a user may step into a scene of a paused video to view a vehicle in the scene from all angles, open the doors and go inside the vehicle, open the console or glove compartment, and so on.

In some embodiments, when an object 810 is selected for manipulation, or when particular manipulations are performed on the selected object by the user 810 via the RVE control interface, the RVE system 100 may access additional and/or different 3D graphics applications and/or apply additional or different 3D graphics techniques than were originally used to generate and render the object 810 in the scene 804 of the video being played back, and may render the object 810 for exploration and manipulations according to the different applications and/or techniques. For example, the RVE system 100 may use additional or different techniques to add or improve texture and/or illumination for an object 810 being rendered for exploration and manipulation by the user.

In some embodiments, when an object 810 is selected for manipulation, or when particular manipulations are performed on the selected object by the user, the RVE system 100 may access a different 3D model of the object 810 than the 3D model that was originally used to generate and render the object in the scene 804 of the video being played back, and may render a 3D representation of the object 810 from the different 3D model for exploration and manipulation by the user. The different 3D model may be a more detailed and richer model of the object 810 than the one originally used to render the scene 804, and thus may provide finer detail and a finer level of manipulation of the object 810 than would the less detailed model. As just one non-limiting example, a user can step into a scene of a paused video to view, select, and explore a vehicle in the scene. In response to selection of the vehicle for exploration and/or manipulation, the RVE system 100 may go to the vehicle's manufacturer site or to some other external source to access detailed 3D model data for the vehicle, which may then be rendered to provide the more detailed 3D model of the vehicle to the user rather than the simpler, less detailed, and possibly less current or up-to-date model that was used in originally rendering the video.

Still referring to FIG. 8B, at least some embodiments of an RVE system 100 may implement methods that allow users to view and explore in more detail the features, components, and/or accessories of selected objects (e.g., object 810) that are being manipulated and explored. For example, a user may be allowed to zoom in on a selected object 810 to view features, components, and/or accessories of the selected object 810 in greater detail. As simple, non-limiting examples, a viewer may zoom in on a bookshelf to view titles of books, or zoom in on a table to view covers of magazines or newspapers on the table. As another non-limiting example, a viewer may select and zoom in on an object such as a notepad, screen, or letter to view the contents in greater detail, and perhaps even to read text rendered on the object. As another non-limiting example as shown in FIGS. 8A and 8B, a computing device that is rendered in the background of a scene and thus not shown in great detail may be selected, manipulated, and zoomed in on to view fine details on the device's screen or of the device's accessories and interface components such as buttons, switches, ports, and keyboards, or even model or part numbers. As another non-limiting example, an automobile that is rendered in the background of a scene and thus not shown in great detail may be selected, manipulated, and zoomed in on to view fine details of the outside of the automobile. In addition, the viewer may open the door and enter the vehicle to view interior components and accessories such as consoles, navigation/GPS systems, audio equipment, seats, upholstery, and so on, or open the hood of the vehicle to view the engine compartment.

In addition to allowing users to select and manipulate objects in a scene as described above, at least some embodiments of an RVE system 100 may implement methods that allow users to interact with interfaces of selected objects or interfaces of components of selected objects. As an example of a device and interactions with a device that may be simulated by RVE system 100, a viewer may be able to select a rendered object representing a computing or communications device such as a cell phone, smart phone, tablet or pad device, or laptop computer, and interact with the rendered interface of the device to simulate actual operations of the device. As another example of a device and interactions with a device that may be simulated by RVE system 100, a user may enter an automobile rendered on the client device 180 and simulate operations of a navigation/GPS system in the automobile's console via the rendered representation of the navigation/GPS system's interface. The rendered object may respond appropriately to the user's interactions, for example by appropriately updating a touchscreen in response to a swipe or tap event. Reactions of a rendered object in response to the user's interactions via the rendered interface may, for example, be simulated by the RVE system 100 according to the object type and object data, or may be programmed, stored with, and accessed from the object's 3D model data or other object information.

Figure 9:
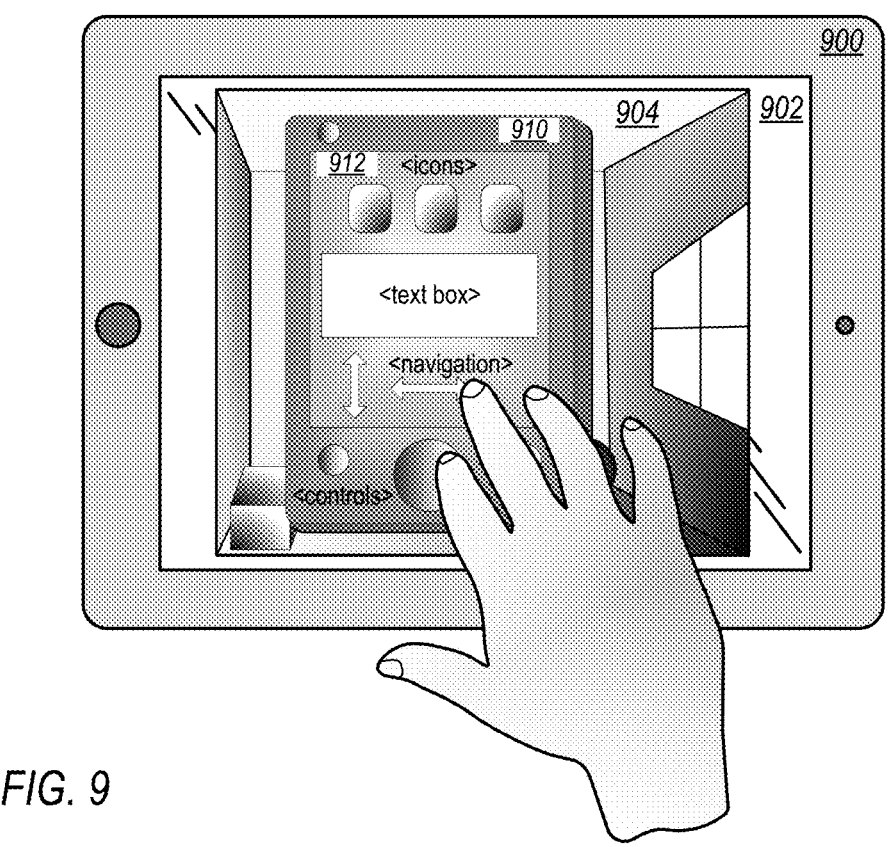
FIG. 9 graphically illustrates interacting with components of a selected object while exploring a rendered model of a scene, according to at least some embodiments.

FIG. 9 graphically illustrates interacting with components and interfaces of a selected object while exploring a rendered 3D model of a scene, according to at least some embodiments. FIG. 9 shows, as an example of a client device 180, a touch-enabled consumer device 900, such as a tablet or smartphone device. The device 900 includes a touch-enabled display screen 902 to which a rendered scene 904 including an object 910 with an interface may be displayed. In FIG. 9, the user has selected the object 910 in the scene 904, and the scene 904 is paused. The user has also used one or more user interface techniques (e.g., touch gestures) to zoom in on the object 910 to show the object 910 in greater detail. In this example, the selected object 910 is a consumer electronic device 910 such as a smartphone, PDA, or tablet device. However, the object 910 may be any type of object, or component of an object, with an interface. As examples of interactions with an interface of an object 910, on a rendered representation of a touchscreen 912 interface of a device 910 such as a tablet or smartphone, the user may be allowed to tap on the touchscreen 912, select icons, open applications, perform various touch operations such as swiping and tapping, view and enter text, and otherwise simulate actual operations of the device through the interface displayed on the screen 902 of client device 900. The user may also interact with at least some other "physical" controls of the device 910 such as buttons, switches, or other interface components that are rendered for the device 910 on the screen 902. The rendered object 910 may respond appropriately to the user's interactions, for example by appropriately updating the touchscreen 912 in response to a swipe or tap event. Reactions of the rendered object 910 in response to the user's interactions via the rendered interface may, for example, be simulated by the RVE system 100 according to the object type/model and object data accessed by the RVE system 100, or may be programmed, stored with, and accessed from the object's 3D model data or other object information local to RVE system 100 or on a remote site such as a manufacturer's site.

Referring to FIGS. 8A, 8B, and 9, in at least some embodiments, an RVE system 100 may leverage network-based computation resources and services (e.g., a streaming service) to receive the user's manipulations of objects in scenes on a client device, responsively generate or update 3D models of the scenes with modified renderings of the manipulated objects in response to the user input, render new video of the scenes, and deliver the newly rendered video to the client device in real-time or near-real-time as a video stream. The computational power available through the network-based computation resources, as well as the video and audio streaming capabilities provided through a streaming protocol, may allow the RVE system 100 to provide low-latency responses to the user's interactions with the objects in a scene, thus providing responsive and interactive manipulations of the objects to the user.

Other RVE Client System Implementations

Figure 10:
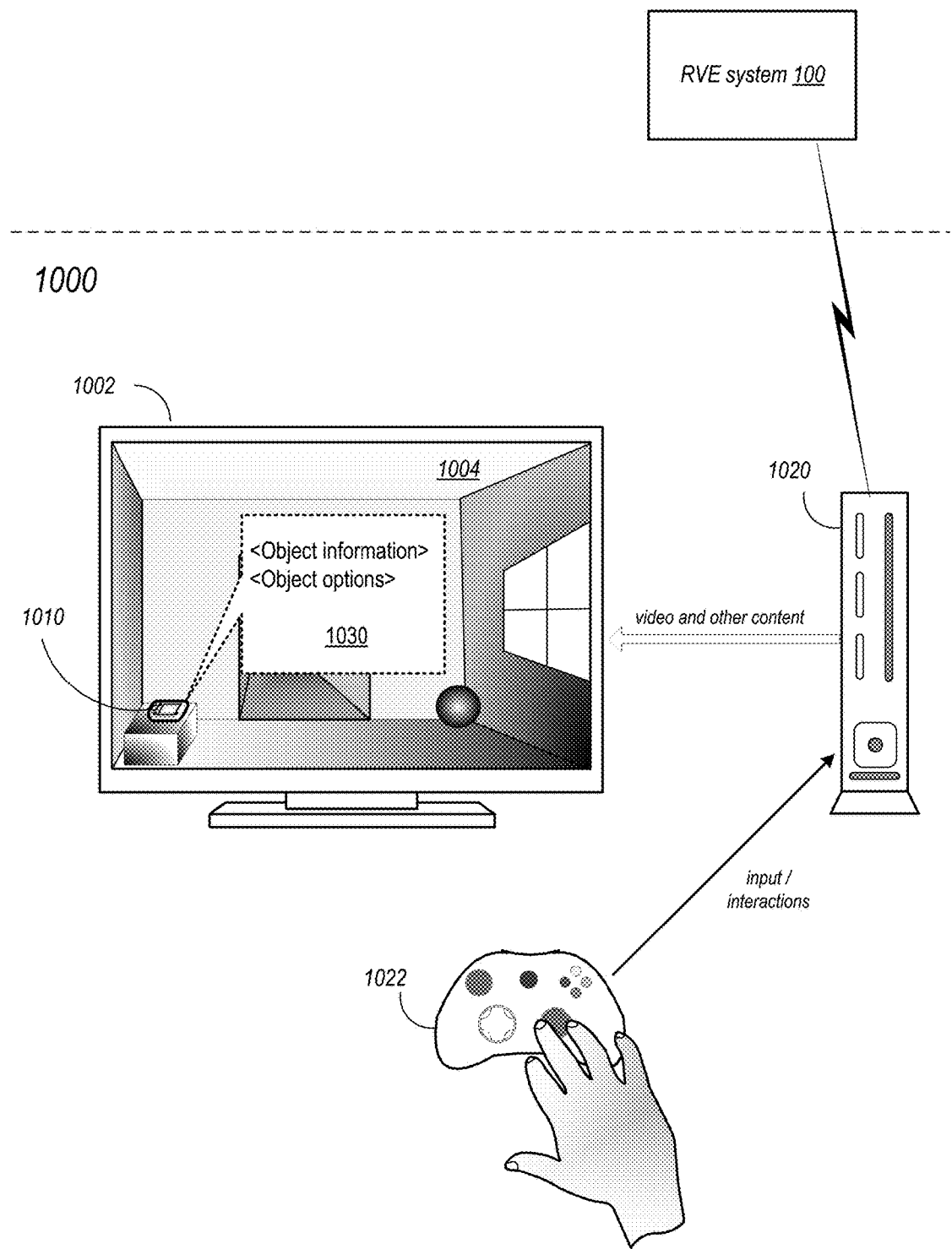
FIG. 10 illustrates an example RVE system and environment in which a client device uses an external control device to explore the video content, according to at least some embodiments.
Figure 11:
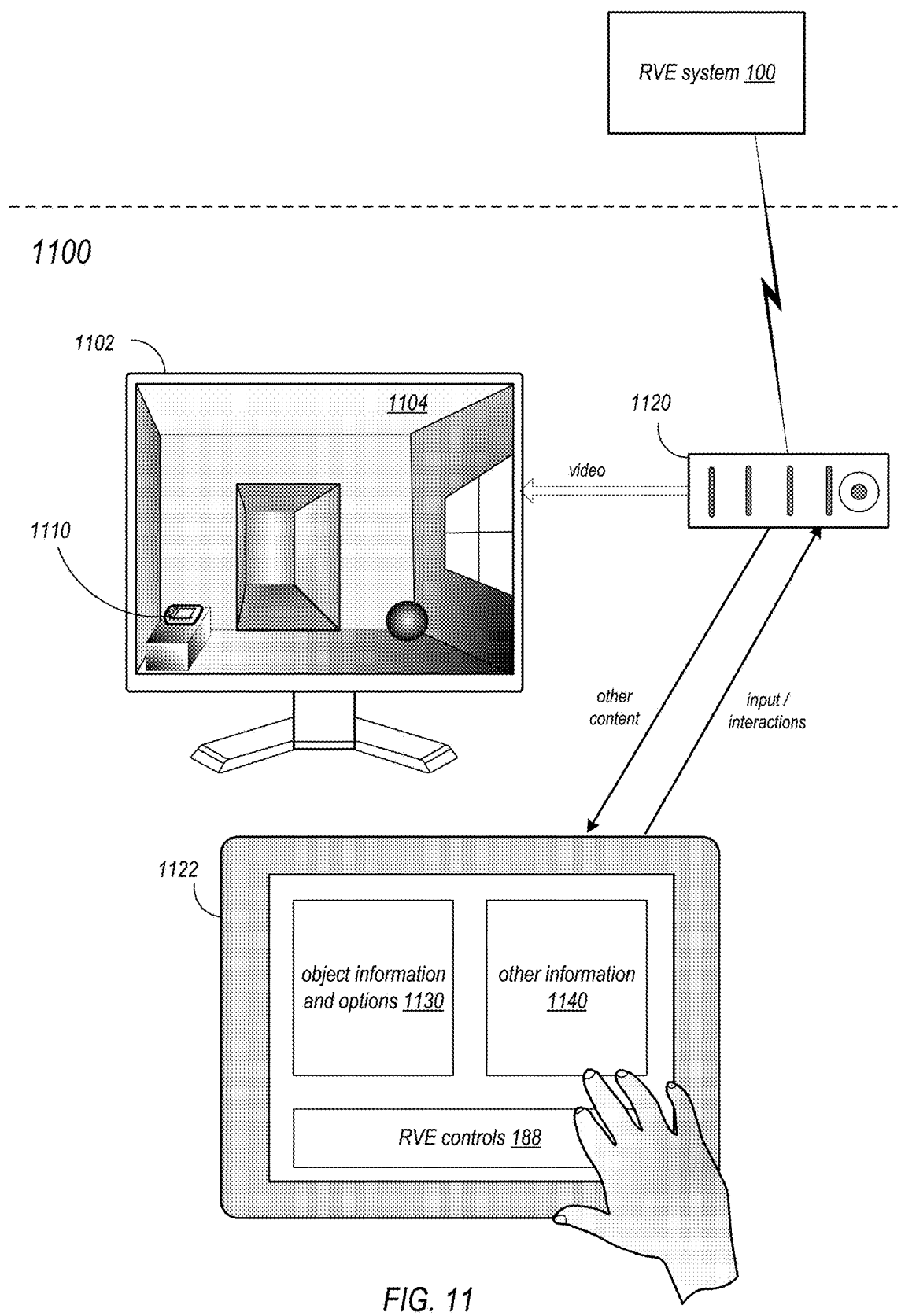
FIG. 11 illustrates an example RVE system and environment in which a client device uses a "second screen" to explore the video content, according to at least some embodiments.

FIGS. 7A through 9 show, as an example of a client device 180, a consumer device with a touchscreen interface such as a tablet or smartphone device. However, other client devices 180 and interfaces may be used in embodiments. FIGS. 10 and 11 show some non-limiting examples of other RVE client devices that may be used, and also further illustrate aspects of scene exploration and object manipulation in an RVE environment.

FIG. 10 illustrates an example RVE system and environment in which a client device 1000 uses an external control device 1022 to explore video content, according to at least some embodiments. FIG. 10 also graphically illustrates selecting an object and obtaining information about the object while exploring a rendered 3D model of a scene, according to at least some embodiments. Client device 1000 may include a display 1002 and an external control device 1022 coupled (via wired or wireless connections) to a central unit 1020. Central unit 1020 may, for example, be a game controller, a set-top box, a desktop or other computer, a cable box or modem, or in general any device or unit that can communicate with RVE system 100, display 1002, and control device 1022. An example computing device that may be used as a central unit 1020 is illustrated in FIG. 16. Display 1002 may, for example, be a video monitor or television set of any of various types, or may be a display screen of a computing device such as a laptop or desktop computer or tablet device, or of some other device. Display 1002 may be external to central unit 1020 as shown, or alternatively may be integrated with central unit 1020. External control device 1022 may, for example, be a game controller or a conventional remote control unit or "remote" that may be provided with, or programmed to operate with, different consumer devices.

Video streamed from RVE system 100 to device 1000 may be received at central unit 1020, processed, and displayed to display 1002. Initially, the streamed video may be a pre-recorded video being played back to device 1000 from the RVE system 100. Via the remote control device 1022, the user may interact with an RVE control method implemented by the RVE client on device 1000 to pause the video at a scene 1004. For example, a control window may be displayed, and the user may select a "pause" interface element from the window via device 1022. Alternatively, device 1022 may have a "pause" button or other interface element that may be selected to pause the video at the scene 1004. Other methods may be used to pause a video in various embodiments. The user may then use remote control device 1022 to explore the scene 1004 (e.g., change viewing angles, changes positions, etc.) and to select and manipulate objects, such as object 1010, as described herein. In response to user exploration, selection, and manipulation input to remote control device 1022, the RVE system 100 may, if necessary obtain additional 3D data for accessorizing or modifying the selected object 1010, for example from one or more external sources, and may generate, render, and stream an updated view of scene reflecting the user input.

In FIG. 10, the user has selected object 1010 in the scene 1004, and the scene 1004 is paused. In this example, the selected object 1010 is a consumer electronic device such as a smartphone, PDA, or tablet device. However, note that the object 1010 may be virtually anything that can be rendered from a 3D model. In at least some embodiments, the user may interact with the displayed object 1010 via device 1022 to obtain more information about the object 1010. The RVE system 100 may obtain and provide information for the selected object 1010 to the client device 1000 in response to the request for information. For example, in some embodiments, the user may use device 1022 to select the displayed object 1010; in response to the selection, a window 1030 of information about the object 1010 may be displayed to display 1002. Options for manipulating or modifying the object 1010 may also be displayed to window 1030.

FIG. 11 illustrates an example RVE system and environment in which an RVE client device 1100 uses a "second screen" 1122 to explore the video content, according to at least some embodiments. FIG. 11 also graphically illustrates selecting an object and obtaining information about the object while exploring a rendered 3D model of a scene, according to at least some embodiments. Client device 1100 may include a first display 1102 and a second display 1122 or "second screen" coupled (via wired or wireless connections) to a central unit 1120. Video streamed from RVE system 100 to device 1100 may be received at central unit 1120, processed, and displayed to display 1102. Initially, the streamed video may be a pre-recorded video being played back to device 1100 from the RVE system 100. Via RVE controls 188 (see, e.g., FIG. 1C) displayed on second screen 1122, the user may pause the video at a scene 1104. The user may then use RVE controls 188 on second screen 1122 to explore the scene 1104 (e.g., change viewing angles, changes positions, etc.) and to select and manipulate objects, such as object 1110, as described herein. In some implementations, second screen 1122 may be touch-enabled, and thus the user may interact with the interface displayed on the device 1122 using touch gestures. Instead or in addition, device 1100 may also include external cursor control devices such as a keyboard and mouse or external control devices such as a game controller or remote controller via which the user may interact with the displayed interface on second screen 1122.

In FIG. 11, the user has selected object 1110 in the scene 1104 using RVE controls 188, and the scene 1104 is paused. In at least some embodiments, the user may interact with the displayed object 1110 via RVE controls 188 on second screen 1122 to obtain more information about the object 1110. The RVE system 100 may obtain and provide information for the selected object 1110 to the client device 1100 in response to the request for information. For example, in some embodiments, the user may use RVE controls 188 on device 1122 to select the displayed object 1110; in response to the selection, a window 1130 of information about the object 1110 may be displayed to the second screen 1122 device. Options for manipulating or modifying the object 1110 may also be displayed to window 1030. In at least some embodiments, other information 1140 (e.g., information about the video, the scene, etc.) may also be displayed to device 1122.

Real-time Object Modification in Video Content

At least some embodiments of a real-time video exploration (RVE) system 10 such as RVE system 100 shown in FIG. 1B may implement methods that allow users to interact with selected objects to customize or accessorize the objects. Leveraging network-based computation resources and services and utilizing 3D data for rendered objects in a video, an RVE system 100 may allow a viewer of the video, for example a movie, to pause and "step into" a 3D rendered scene from the video via a client device, for example a device 180 as illustrated in FIG. 1C, and to, discover, select, explore, and manipulate objects within the scene. In addition, for 3D-rendered objects in a scene that can be accessorized or customized with options, the viewer can manipulate or interact with a selected object to add or remove accessories, customize the object (change color, texture, etc.), or otherwise modify the object according to the user's preferences or desires. As a non-limiting example, a user may interact with a rendering of an automobile of a scene to accessorize or customize the car. For example, the user can change the exterior color, change the interior, change the car from a hardtop to a convertible, and add, remove, or replace accessories such as navigation/GPS systems, audio systems, special wheels and tires, and so on. In at least some embodiments, and for at least some objects, the RVE system 100 may also facilitate pricing, purchasing, or ordering of an object (e.g., a car) as accessorized or customized by the user via an interface on the client device.

Since the modifications to an object are done in a 3D-rendered scene/environment, the viewer can customize and/or accessorize an object such as an automobile and then view the customized object as rendered in the 3D world of the scene, with lighting, background, and so on fully rendered for the customized object. In at least some embodiments, the user-modified object may be left in the scene when the video is resumed, and the object as it appears in the original video in this and other scenes may be replaced with the rendering of the user's modified version of the object. Using an automobile as an example, the viewer may customize a car, for example by changing it from red to blue, or from a hardtop to a convertible, and then view the customized car in the 3D modeled world of the scene, or even have the customized car used in the rest of the video once resumed.

In at least some embodiments of an RVE system 100, the ability to customize and/or accessorize objects may, for at least some objects, be linked to external sources, for example manufacturer, dealer, and/or distributor information and website(s). The RVE system 100 may provide an interface, or may invoke an external interface provided by the manufacturer/dealer/distributor, via which the user can customize and/or accessorize a selected object if and as desired (e.g., an automobile, a computing device, an entertainment system, etc.), be given a price or price(s) for the object as customized/accessorized, and even order or purchase the object as specified if desired.

Figure 4:
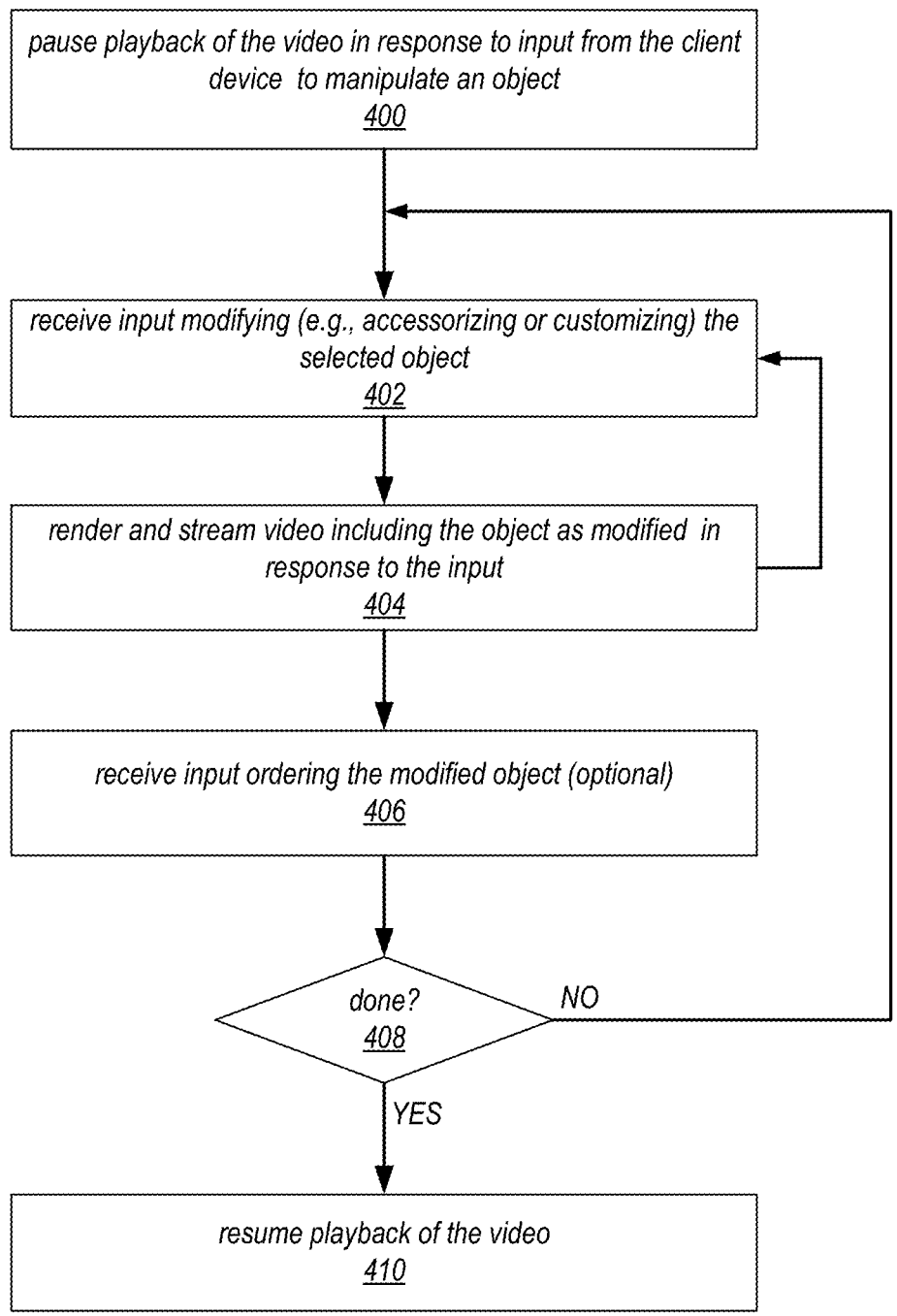
FIG. 4 is a flowchart of a method for modifying and ordering objects while exploring a video being played back, according to at least some embodiments.

FIG. 4 is a flowchart of a method for modifying, and optionally ordering, objects while exploring a video being played back, according to at least some embodiments, and with reference to FIGS. 1A and 1B. As indicated at 400, the RVE system 100 may pause playback of a pre-recorded video being played back to a client device 180 in response to input received from the client device 180 to manipulate an object in a scene. In at least some embodiments, the RVE system 100 may receive input from the client device 180 selecting an object in a scene displayed on the device 180. In response, the RVE system 100 may pause the pre-recorded video being played back, obtain 3D data for the selected object, generate a 3D modeled world for the scene including a new 3D model of the object according to the obtained data, and render and stream new video of the scene to the client device 180.

As indicated at 402, the RVE system 100 may receive input from the client device 180 indicating that the user is interacting with the selected object via the device to modify (e.g., accessorize or customize) the selected object. In response, the RVE system 100 may obtain additional 3D data for accessorizing or modifying the selected object, and generate a new 3D modeled world for the scene including a new 3D model of the object according to the modifications specified by the user input. As indicated at 404, the RVE system 100 may render and stream new video of the scene from the 3D modeled world including the 3D model of the object as modified by the input to the client device 180.

As shown at 406, optionally, the RVE system 100 may receive additional input from the client device 180 requesting additional information about the object as modified (e.g., pricing, availability, vendors, dealers, etc.), and/or additional information indicating that the user wants to purchase or order a physical version of the object as modified (or as originally rendered, if desired). In at least some embodiments, in response to requests for additional information, the RVE system 100 may provide additional object information (e.g., websites, links, emails, documents, advertisements, pricing, reviews, etc.) to the user via client device 180. In at least some embodiments, in response to a request to order or purchase an item, the RVE system 100 may provide a name, location, URL, link, email address, phone number, and/or other information indicating one or more online or brick-and-mortar sources for ordering or purchasing the object. In some embodiments, the RVE system 100 may provide a purchasing interface via which the user can order the object as modified. In at least some embodiments, a user may order, purchase, or obtain a virtual representation of the object instead of or in addition to a physical version of the object, if desired.

As indicated at 408, the RVE system 100 may continue to render and stream new video of the scene in response to interactions with object(s) in the scene. In at least some embodiments, the RVE system 100 may continue to render and stream new video of the scene until input is received from the client device indicating that the user wants to resume playback of the pre-recorded video. As indicated at 410, upon receiving resume playback input, the RVE system may resume playing back the pre-recorded video to the client device 180. The playback may, but does not necessarily, resume at the point where the playback was paused at 400.

Figure 12:
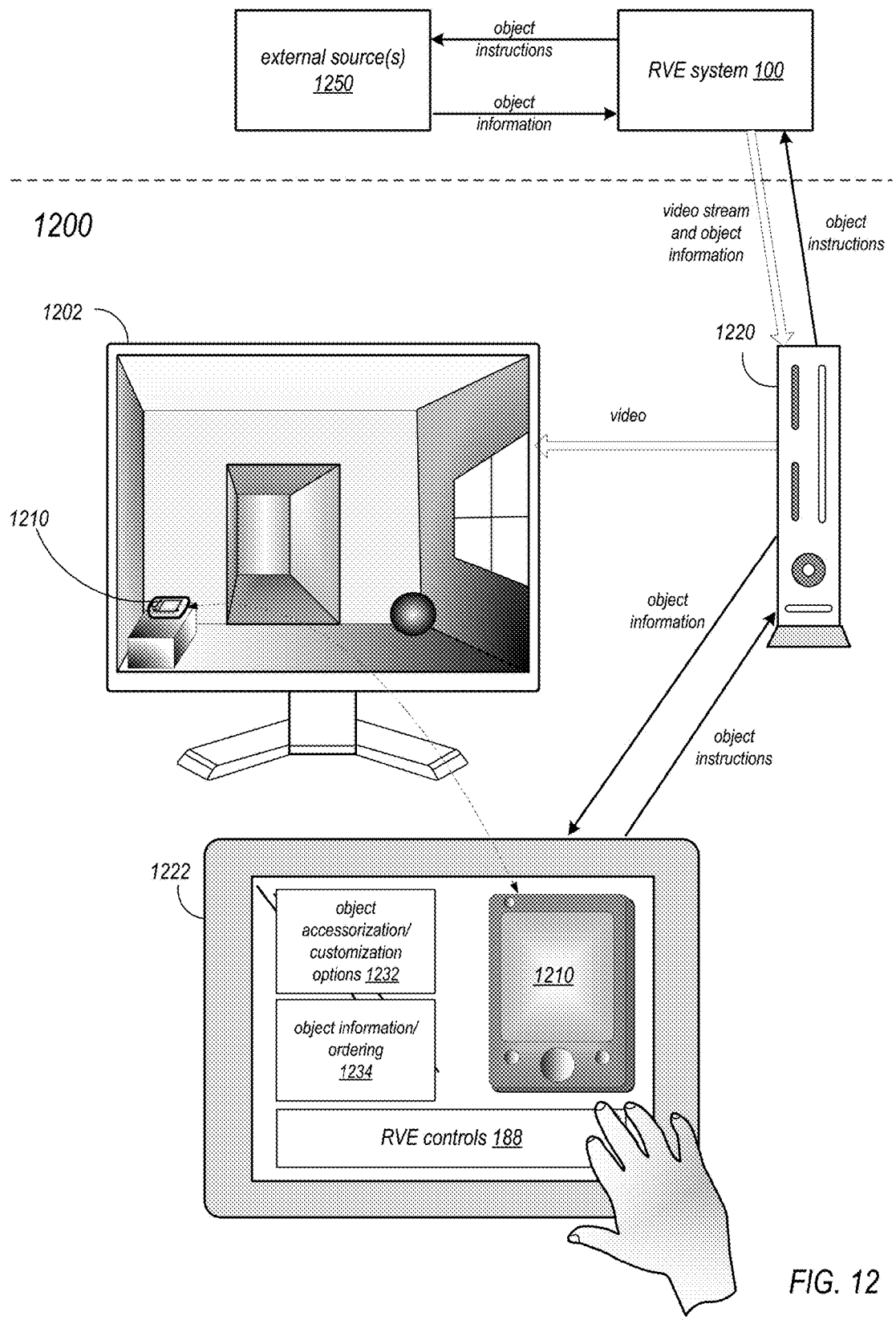
FIG. 12 illustrates an example RVE system and environment in which objects in a pre-recorded video can be modified, new video content including the modified objects can be generated and streamed, and objects from the video can optionally be ordered, according to at least some embodiments.

FIG. 12 illustrates an example RVE system and environment in which objects in a pre-recorded video can be modified, new video content including the modified objects can be generated and streamed, information on objects can be obtained, and virtual or physical versions of objects from the video can optionally be ordered, according to at least some embodiments. In FIG. 12, an RVE client device 1200 uses a "second screen" 1222 to explore the video content, according to at least some embodiments. Client device 1200 may include a first display 1202 and a second display 1222 or "second screen" coupled (via wired or wireless connections) to a central unit 1220. Central unit 1220 may, for example, be a game controller, a set-top box, a desktop or other computer, a cable box or modem, or in general any device or unit that can communicate with RVE system 100 and displays 1202 and 1222. An example computing device that may be used as a central unit 1220 is illustrated in FIG. 16.

Video streamed from RVE system 100 to device 1200 may be received at central unit 1220, processed, and displayed to display 1202. Initially, the streamed video may be a pre-recorded video being played back to device 1200 from the RVE system 100. Via RVE controls 188 (see, e.g., FIG. 1C) displayed on second screen 1222, the user may pause the video at a scene 1204. The user may then use RVE controls 188 to explore the scene 1204 (e.g., change viewing angles, changes positions, etc.), to select and manipulate objects, such as object 1210, and to modify objects such as object 1210 by accessorizing or otherwise customizing the objects. In this example, the selected object 1210 is a consumer electronic device such as a smartphone, PDA, or tablet device. However, note that the object 1210 may be virtually anything that can be rendered from a 3D model and that can be manipulated, customized, and/or accessorized.

In FIG. 12, the user has selected object 1210 in the scene 1204 using RVE controls 188, and the scene 1204 is paused. In at least some embodiments, the user may interact with the displayed object 1210 via RVE controls 188 on second screen 1222 to manipulate the object and/or to obtain more information about the object 1210. In at least some embodiments, a detailed rendering of the selected object 1210 may be displayed to the second screen 1222. The RVE system 100 may obtain information about the selected object 1210, for example from one or more external sources 1250, and may provide the obtained information for the selected object 1210 to the client device 1200 in response to the request for information. For example, in some embodiments, the user may use RVE controls 188 on device 1222 to select the object 1210; in response to the selection, information about the object 1210 may be displayed to the second screen 1222 device, for example to a window 1234, and a detailed rendering of the object 1210 may also be displayed.

In at least some embodiments, one or more accessorization and customization options for modifying the object 1210 may be displayed to a window 1232. The user may then use the interface presented on second screen 1222 to accessorize or customize the object 1210 according to the available options. The object modification input may be received by central unit 1220 and forwarded to RVE system 100. In response to the object modification input, the RVE system 100 may obtain additional 3D data for accessorizing or modifying the selected object 1210, for example from one or more external sources 1250, and generate a new 3D modeled world for the scene including a new 3D model of the object according to the modifications specified by the user input. The RVE system 100 may then render and stream new video of the scene from the 3D modeled world including the 3D model of the object as modified by the input to the client device 1200. At the client device, the modifications to the object 1210 may be reflected on the object 1210 displayed on the second screen 1222 and/or on the object 1210 displayed in scene 1204.

In at least some embodiments of an RVE system 100, the ability to customize and/or accessorize objects may, for at least some objects, be linked to external sources 1250, for example manufacturer, dealer, and/or distributor information and website(s). The RVE system 100 may provide an interface, or may invoke an external interface 1234 such as a web page provided by the manufacturer/dealer/distributor, via which the user can customize and/or accessorize a selected object if and as desired (e.g., an automobile, a computing device, an entertainment system, etc.), be given information including but not limited to a price or price(s) for the object as customized/accessorized, and even order or purchase a physical and/or virtual version of the object from an external source 1250 as specified if desired. In FIG. 12, the interface for customizing and/or accessorizing a selected object, obtaining information such as pricing about the object, and ordering physical and/or virtual versions of the object if desired is shown on second screen 1222 as object accessorization/customization options window 1232 and object information/ordering window 1234.

In at least some embodiments of an RVE system 100, in addition to customizing or accessorizing a selected object 1210, a user may be allowed to replace an object 1210 with a different object. In FIG. 12, for example, the selected object 1210 is a consumer electronic device such as a smartphone, PDA, or tablet device, and in some embodiments the user may be allowed to replace the device with a device of another brand or make. Using an automobile as an example, the viewer may replace one type of car in the 3D rendered environment with another type of car, and then view the different car in the 3D modeled world of the scene, or even have the different car used in the rest of the video once resumed.

Referring to FIG. 12, in at least some embodiments, an RVE system 100 may leverage network-based computation resources and services (e.g., a streaming service) to receive the user's modifications of objects in scenes on a client device, responsively generate or update 3D models of the scenes with modified renderings of the objects in response to the user input, render new video of the scenes, and deliver the newly rendered video to the client device in real-time or near-real-time as a video stream. The computational power available through the network-based computation resources, as well as the video and audio streaming capabilities provided through a streaming protocol, may allow the RVE system 100 to provide low-latency responses to the user's modifications of the objects in a scene, thus providing responsive and interactive modifications of the objects to the user.

Real-time Object Modifications from other Sources

FIG. 4 describes embodiments of a method in which the RVE system 100 may receive input from a client device 180 indicating that a user viewing a video is interacting with an object to modify the selected object. However, input may be received from other sources than viewers to modify objects in videos in real-time.

For example, the RVE system 100 may store viewer preferences or profiles in a database. The viewer profiles or preferences may be accessed according to identities of the viewer(s) when beginning replay of, or during the replay of, a video (e.g., a movie), and used to dynamically and differently render one or more objects in one or more scenes, for example to target the content at the particular viewers according to their respective profiles or preferences. The RVT system 100 may stream video including the targeted content to the respective client device(s). Thus, different viewers of the same video content (e.g., a movie) may be shown the same scenes with differently rendered objects injected into the scenes. In some embodiments, a viewer may change their preferences or profile when viewing a video, and the RVT system 100 may dynamically and differently render one or more objects in one or more scenes in response to the change(s).

As another example the RVT system 100 may obtain input modifying objects in video from one or more sources other than the viewers, for example from manufacturer, vendor, dealer, or distributor websites. The modifications received from external sources may be used to dynamically and differently render one or more objects in one or more scenes of one or more videos. The modifications may, for example, target video content or objects at particular viewers or groups of viewers for marketing- or advertising-based placement of particular products based on the viewers' preferences or profiles, or based on other information such as demographics data.

In at least some embodiments, the graphics data used to modify objects may be obtained from a data store maintained by the RVT system 100. However, in at least some embodiments, at least some of the graphics data for modifying video content may be obtained from other, external data sources, for example from manufacturer, vendor, dealer, or distributor websites. For example, modifications to a rendered object, or a modified version of the object, may be received from a seller of a physical version of the rendered object.

Generating New Video Content from Pre-recorded Video

Figure 6A:
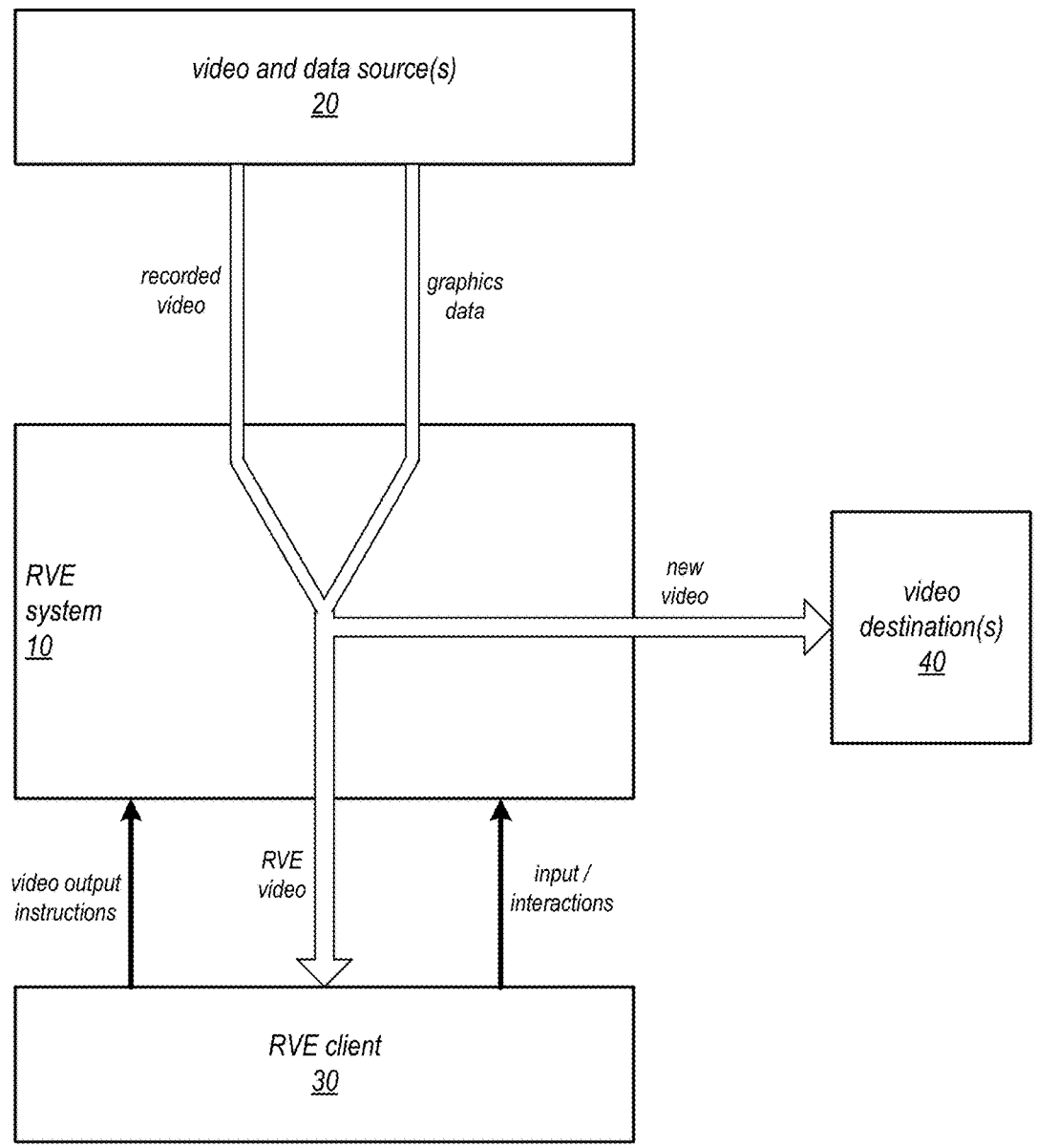
FIG. 6A is a high-level illustration of a real-time video exploration (RVE) system that enables the generation of new video from pre-recorded video, according to at least some embodiments.

At least some embodiments of a real-time video exploration (RVE) system 10 may allow a user to generate their own customized version of a video such as a movie. The generated video may be recorded for later playback, or may be streamed or broadcast "live" to other endpoints or viewers. FIG. 6A is a high-level illustration of a real-time video exploration (RVE) system 10 that enables the generation and output of new video from pre-recorded video, according to at least some embodiments. A user may interact with video via an RVE client 30 to generate modified or customized video from pre-recorded video and graphics data obtained from one or more sources 20. In at least some embodiments, the RVE system 10 may play back video from one or more sources 20 to the RVE client 30, receive user input/interactions within scenes being explored from the respective RVE client 30, responsively generate or update 3D models from graphics data obtained from one or more sources 20 in response to the user input/interactions exploring the scenes, render new video content of the scenes at least in part from the 3D models, and deliver the newly rendered video content (and audio, if present) to the respective RVE client 30 as RVE video.

For example, a user may pause a video being replayed at a scene, change the viewing angle and/or viewing position for the scene via a user interface to the RVE system 10 (e.g., RVE controls 188 as shown in FIG. 1C), and re-render a portion of or the entire scene using the modified viewing angle and/or position, for example using a method as illustrated in FIG. 2. As another example, the user may modify the scene by adding, removing, or modifying various graphics effects such as lens effects, lighting effects, color effects, or various simulated effects to the scene. The user may do this for one or more scenes in a video (e.g., a movie), to generate a new version of the entire video or a portion thereof including the modified and re-rendered views of the scene(s).

As another example, the user may manipulate, modify, customize, accessorize and/or rearrange objects in one or more scenes of a video using one or more of the methods previously described, for example in FIGS. 3 and 4, and/or remove or add objects to a scene, to generate a new version of the entire video or a portion thereof including the modified object(s) in the scene(s). One or more of these methods, or combinations of two or more of these methods, may be used to modify or customize a given scene or video.

The user may interact with RVE system 10 via RVE client 30 to record, stream, and/or broadcast the new video to one or more destinations 40. The new versions of videos or portions of videos so produced may, for example, be stored or recorded to local or remote storage, shown to or shared with friends, or may be otherwise recorded, stored, shared, streamed, broadcast, or distributed assuming the acquisition of appropriate rights and permissions to share, distribute, or broadcast the new video content. In at least some embodiments, RVE system 10 may provide one or more application programming interfaces (APIs) for receiving input from and sending output to RVE client(s) 30.

Figure 5:
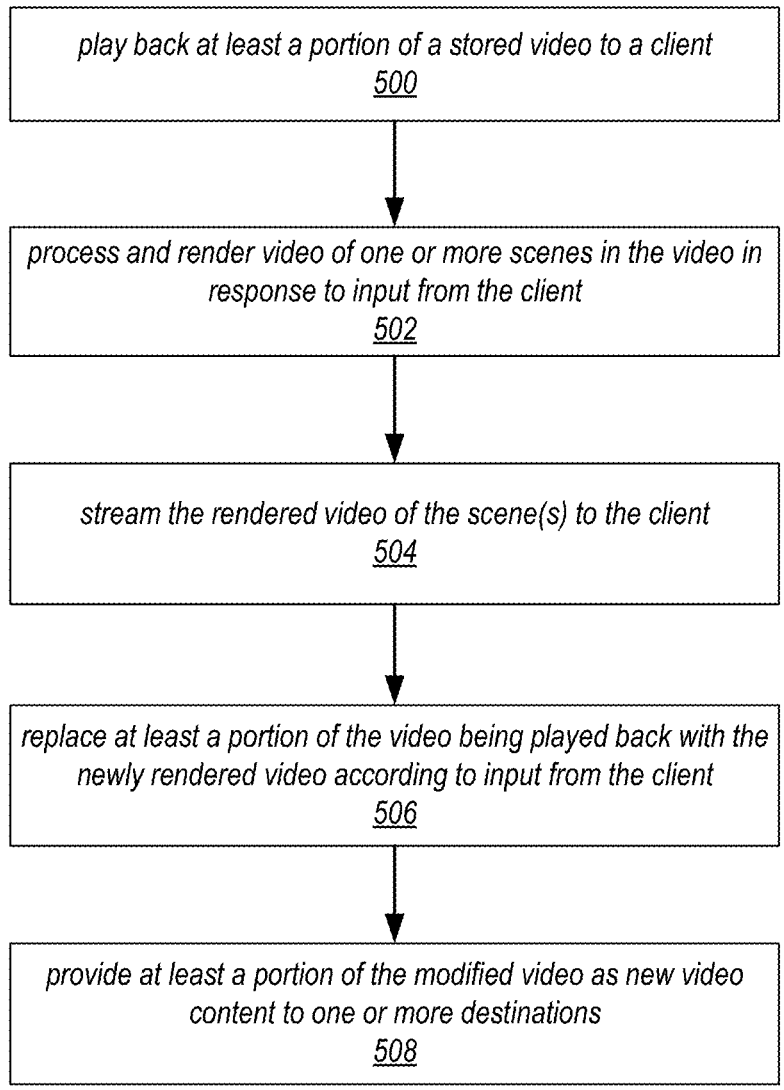
FIG. 5 is a flowchart of a method for rendering and storing new video content during playback of pre-recorded video, according to at least some embodiments.

FIG. 5 is a flowchart of a method for rendering and storing new video content during playback of pre-recorded video, according to at least some embodiments, and with reference to FIG. 6A. As indicated at 500, an RVE system 10 may play back at least a portion of a pre-recorded video to an RVE client 30. As indicated at 502, the RVE system 10 may process and render video of one or more scenes in the video in response to input from the RVE client 30. For example, in at least some embodiments, a user may pause a video being replayed, change the viewing angle and/or viewing position for the scene, and re-render the scene or a portion thereof using the modified viewing angle and/or position, for example using a method as described in FIG. 2 and illustrated in FIGS. 7A and 7B. As another example, the user may manipulate, modify, customize, accessorize and/or rearrange objects in one or more scenes, for example as described in FIGS. 3 and 4 and illustrated in FIGS. 8A through 12. Note that one or more of these methods, or combinations of two or more of these methods, may be used to modify a given scene or portions of a scene. As indicated at 504, the RVE system 10 may stream the newly rendered video of the scene to the RVE client 30. As indicated at 506, at least a portion of the video being played back may be replaced with the newly rendered video according to input from the RVE client 30. For example, one or more scenes in the original video may be replaced with newly rendered scenes recorded from modified perspectives and/or including modified content to generate a new version of the original video. As indicated at 508, at least a portion of the modified video may be provided to one or more destinations 30 as new video content. New versions of videos or portions of videos so produced may, for example, be recorded or stored to local or remote storage, shown to or shared with friends, or may be otherwise stored, shared, streamed, broadcast, or distributed assuming the acquisition of appropriate rights and permissions to share or distribute the new video content.

The elements of FIG. 5 are explained below in more detail with further reference to FIGS. 6B and 6C.

Figure 6B:
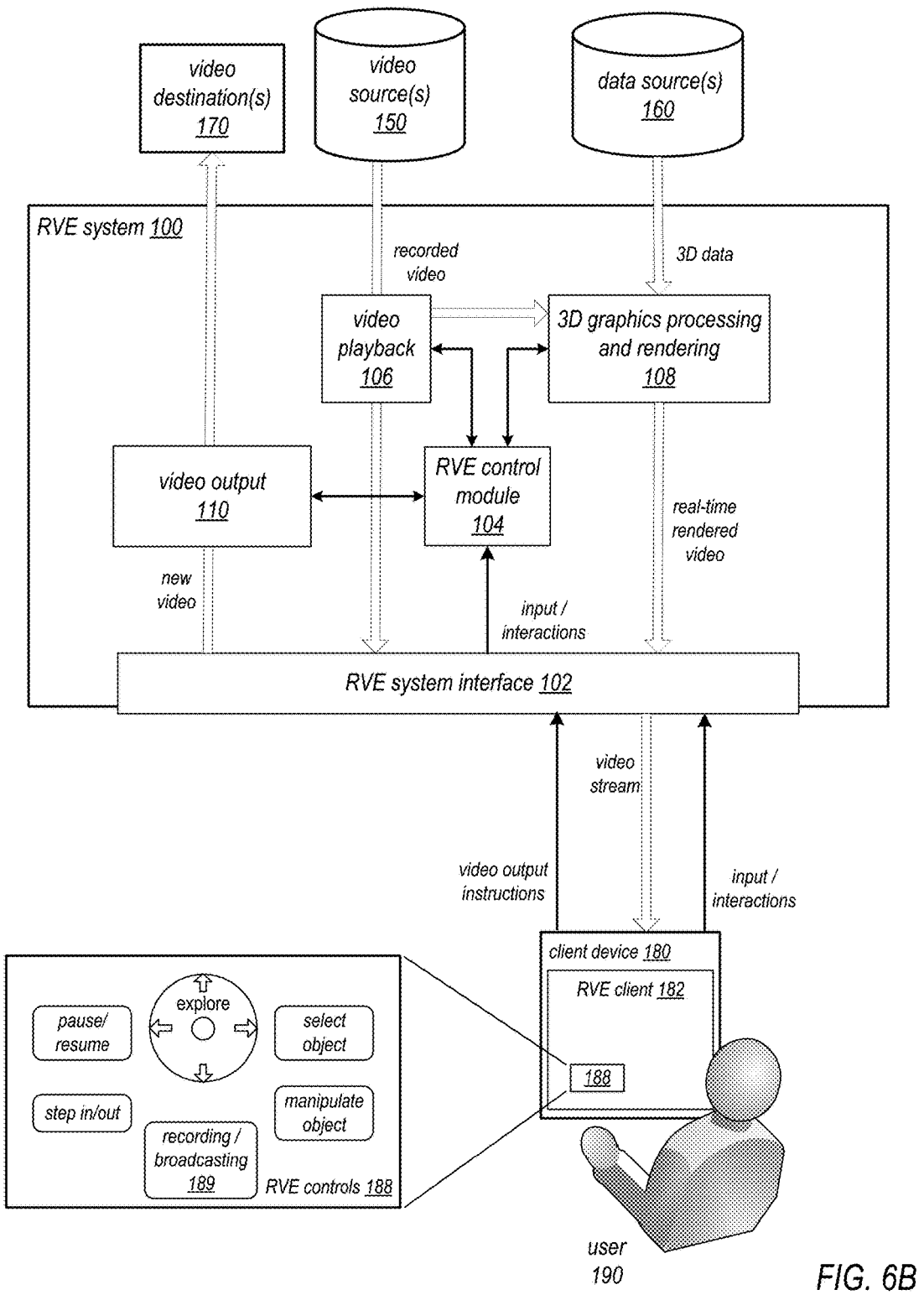
FIGS. 6B and 6C illustrate example real-time video exploration (RVE) systems and environments in which users can render and store new video content during playback of a pre-recorded video, according to at least some embodiments.
Figure 6C:
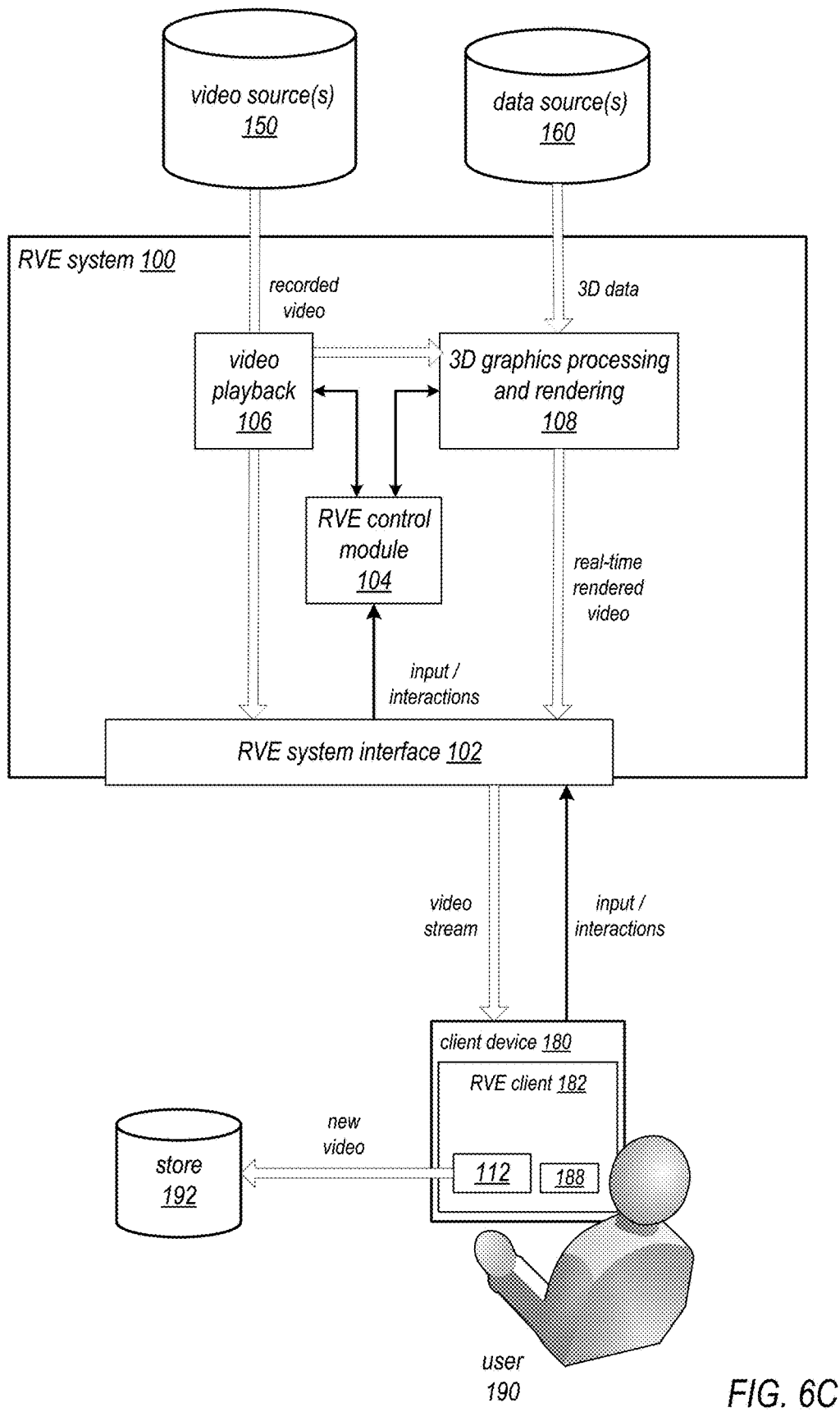

FIGS. 6B and 6C illustrate example real-time video exploration (RVE) systems 100 in RVE environments in which users can generate, render and store new video content during playback of a pre-recorded video, according to at least some embodiments. As shown in FIG. 6B, in at least some embodiments, an RVE environment may include an RVE system 100 and one or more client devices 180. An example client device 180 that may be used is shown in FIG. 1C. A client device 180 may implement an RVE client 182 and RVE controls 188. The RVE system 100 has access to stores or other sources of pre-rendered, pre-recorded video, shown as video source(s) 150. The RVE system 100 also has access to stores or other sources of data and information including but not limited to 3D graphics data, shown as data source(s) 160. The 3D graphics data may include, but is not limited to, data that was used in generating and rendering scenes for at least some of the pre-recorded video available from video sources 150, and may also include additional 3D graphics data.

As shown in FIG. 6B, in at least some embodiments, the RVE system 100 may include a video playback 106 module or component and an RVE system interface 102. In at least some embodiments, RVE system interface 102 may be or may include one or more application programming interfaces (APIs) for receiving input from and sending output to RVE client(s) 182 on client device(s) 180. In response to user selection of a video for playback to client device 180, the video playback 106 module may obtain pre-rendered, pre-recorded video from a video source 150, process the video as and if necessary, and stream the pre-recorded video to the respective client device 180 via RVE system interface 102. The RVE system 100 may also include a 3D graphics processing and rendering 108 module or component. During an RVE event in which the user 190 pauses a video being played back to client device 180, steps into a scene, explores, and possibly modifies video content such as rendered objects via RVE client 182, 3D graphics processing and rendering 108 module may obtain 3D data from one or more data sources 160, generate a 3D modeled world for the scene according to the obtained 3D data and user input, render 2D representations of the 3D modeled world from user-controlled camera viewpoints, and stream the real-time rendered video to the respective client device 180 via RVE system interface 102.

As shown in FIG. 6B, in at least some embodiments, the RVE system 100 may also include a video output 110 module or component that may record and/or broadcast new video content generated in the RVE environment to one or more destinations 170. For example, during (or after) an RVE event in which new video content is generated and rendered from pre-recorded video being played back, video output 110 module may receive at least a portion of the real-time rendered video from 3D graphics processing and rendering 108 module and record the new video to a video destination 170. In some embodiments, video output 110 module may also receive at least a portion of the pre-recorded video being played back through video playback 106 module and merge or combine the real-time rendered video with the pre-recorded video, for example by replacing particular scenes or portions thereof in the original, pre-recorded video and recording and/or broadcasting the results as new video to one or more destinations 170

As shown in FIG. 6B, in at least some embodiments, the RVE system 100 may also include an RVE control module 104 that receives input and interactions from an RVE client 182 on a respective client device 180 via RVE system interface 102, processes the input and interactions, and directs operations of video playback module 106, 3D graphics processing and rendering 108 module, and new video output 110 module accordingly. In at least some embodiments, the input and interactions may be received according to an API provided by RVE system interface 102.

In at least some embodiments, user 190 may modify one or more scenes of a video being played back by video playback 106 module RVE system 100 using an RVE controls 188 interface to RVE system 100 as implemented by an RVE client 182 on a client device 180. An example of a client device 180 and RVE client 182 are shown in FIG. 1C. FIGS. 7A through 12 illustrate several example RVE systems and environments in which client devices use different components or devices to implement an RVE controls 188 interface. For example, in at least some embodiments, a user 190 may pause a video being replayed via video playback 106 module, change the viewing angle and/or viewing position for the scene via RVE controls 188, and re-render the scene or a portion thereof using the modified viewing angle and/or position, for example using a method as described in FIG. 2 and illustrated in FIGS. 7A and 7B. As another example, the user 190 may manipulate, modify, customize, accessorize and/or rearrange objects in one or more scenes, for example as described in FIGS. 3 and 4 and illustrated in FIGS. 8A through 12. Note that one or more of these methods, or combinations of two or more of these methods, may be used to modify a given scene or portions of a scene. The user may use these methods to modify one, two, or more scenes or portions thereof in a video (e.g., a movie).

In at least some embodiments, in addition to controls for pausing, exploring, and modifying video content of scenes in a video being played back from RVE system 100, the RVE controls 188 interface may include one or more controls 189 via which the user 190 may record and/or broadcast new video content generated by 3D graphics processing and rendering 108 module according to the user's modifications and manipulations of scenes from a pre-recorded video (e.g., movie) being played back. In at least some embodiments, using controls 189 of the RVE controls 188 interface, the user 190 may be able to selectively specify which parts of a video being played back are to be replaced by new video content rendered by 3D graphics processing and rendering 108 module. The user 190 may also be able to perform various other recording and/or broadcasting functions using controls 189 of the RVE controls 188 interface. As a non-limiting example, in at least some embodiments, the user 190 may be able to create new video content by combining one or more newly rendered scenes or portions of scenes as modified by the user from scenes in one or more videos.

As an example method of recording new video, in at least some embodiments, a user 190 may change the viewing angle and/or viewing position for the scene via RVE controls 188, re-render the scene or a portion thereof using the modified viewing angle and/or position, and select a "record scene" option from RVE controls 188. Instead or in addition, the user 190 may manipulate, modify, customize, accessorize and/or rearrange objects in a scene and select a "record scene" option from RVE controls 188. In at least some embodiments, each modified scene that the user 190 so records may be recorded to one or more destinations 170 as new video content by a video output 110 component of RVE system 100, for example to a local store of client device 180 or to a remote store (e.g., video source(s) 150) accessed and provided through RVE system 100. In at least some embodiments, the user 190 may direct RVE system 100 to combine two or more such scenes into new video content using RVE controls 188. In response, video output 110 module of the RVE system 100 may combine the scenes into a single, new video segment and store the new video. In at least some embodiments of an RVE system 100, modified and rendered scenes generated from two or more pre-recorded videos may be combined to produce new video content.

As another example method of recording new video, in at least some embodiments, a user 190 may modify one or more scenes of a pre-recorded video (e.g., a movie) being played back by changing viewpoint positions and angles and/or by manipulating various object(s), save particular ones of the modifications or modified scenes, and then select a "record new version of video" option from RVE controls 188. In response, video output 110 module may generate and record a new version of the video by combining new video content rendered by 3D graphics processing and rendering 108 module with video content from the original video. For example, one or more scenes or portions thereof in the original video may be replaced with new versions of the scenes as rendered by 3D graphics processing and rendering 108 module.

In at least some embodiments, instead of or in addition to recording new video and playing back the recorded new video, the RVE system 100 may enable the real-time streaming or broadcasting of new video generated by a user via an RVE client 182 as described herein to one, two, or more other endpoints as destinations 170 for display. An endpoint may, for example, be another RVE client 182 on another client device 180. However, an endpoint may be any device configured to receive and display a video stream from RVE system 100. As an example of broadcasting new video, in some embodiments a user may use an RVE client 182 on a client device 180 to perform a "video DJ" function in which the user customizes input video using the RVE system 100 in real-time and broadcasts the customized video via the RVE system 100 in real-time to one or more endpoints, for example one or more local or remote devices configured to display video received in streams from RVE system 100.

FIG. 6B shows a video output 110 module implemented by RVE system 100. However, as shown in FIG. 6C, in some embodiments a video output 112 module may instead or in addition be implemented by an RVE client 182 on a client device 180. During an RVE event in which new video content is generated and rendered by 3D graphics processing and rendering 108 module from pre-recorded video being played back by video playback 106 module and streamed to the client device 180 through RVE system interface 102, video output 112 module on client device 180 may receive and record at least a portion of the video being streamed from RVE system 100 to client device 180 to a store 192. Store 192 may, for example, be a local store of client device 180, or network-based storage. Note that the video being streamed from RVE system 100 to client device 180 may include real-time rendered video from 3D graphics processing and rendering 108 module as well as pre-recorded video being played back through video playback 106 module.

Example Real-time Video Exploration (RVE) Use Cases

FIG. 2 illustrates a method for exploring a 3D modeled world in real-time during playback of pre-recorded video by an RVE system 100 in which a viewer can pause a video (e.g. a movie), step into a scene, and explore the scene. In addition, FIG. 3 illustrates a method in which the viewer can manipulate objects and discover more information about object within a paused scene during exploration using the RVE system 100. These methods may be used in some embodiments to provide engaging, interactive video experiences in which a user may look for clues, "Easter Eggs", or other content that may be embedded or concealed in a scene of a movie or other video by the creator, and that may be hidden or not easily detectable during normal playback of the scene.

As an example, for some types of story lines, for example murder mysteries, a viewer can play back and view the movie as normal using the RVE system 100. However, if the viewer chooses, the viewer can pause the video at a scene, step into the scene, and look or search for clues that may be hidden or at least not obvious in the pre-rendered scene using the RVE system 100. The viewer can explore the scene in more detail and from different angles and positions, looking behind and under objects, and manipulating objects to look for clues or further investigate the objects. For example, there may be a note on a desk, or in a drawer of the desk, or even in the pocket of a victim that the viewer can discover and read. As another example, there may be a text message or voice message on a cell phone, or an email message on a computer screen, that the user can access by interacting with the respective objects to view or even listen to. As another example, an object may be hidden under a couch or bed, or in a closet, that the viewer might discover. As another example, clues may be hidden in the trunk of a car, or elsewhere in the car. As another example, weapons may be discovered, or footprints, fingerprints, or other forensic evidence. The viewer can thus pause, step into, and interact with scenes in a movie being played back to personally look for clues and investigate a mystery on his or her own. When done, the viewer can resume normal playback of the movie.

As another example, a video content creator may hide one or more "Easter Eggs" in a video such as a movie. An "Easter Egg" is an interesting object that may be hidden in a scene. If a viewer chooses, the viewer can pause the video at a scene, step into the scene, and look or search for "Easter Egg" that may be hidden or at least not obvious in the pre-rendered scene using the RVE system 100.

Example RVE Network Environments

Embodiments of real-time video explorer (RVE) systems that implement one or more of the various methods as described herein, for example an example RVE system 100 as illustrated in FIG. 1B, 6B, or 6C that implements the methods as illustrated in FIGS. 2 through 5, may be implemented in the context of a service provider that provides virtualized resources (e.g., virtualized computing resources, virtualized storage resources, virtualized database (DB) resources, etc.) on a provider network to clients of the service provider, for example as illustrated in FIG. 13. Virtualized resource instances on the provider network 2500 may be provisioned via one or more provider network services 2502 and may be rented or leased to clients of the service provider, for example to an RVE system provider 2590 that implements RVE system 2510 on provider network 2502. At least some of the resource instances on the provider network 2500 may be computing resources 2522 implemented according to hardware virtualization technology that enables multiple operating systems to run concurrently on a host computer, i.e. as virtual machines (VMs) on the host. Other resource instances (e.g., storage resources 2552) may be implemented according to one or more storage virtualization technologies that provide flexible storage capacity of various types or classes of storage to clients of the provider network. Other resource instances (e.g., database (DB) resources 2554) may be implemented according to other technologies.

In at least some embodiments, the provider network 2500, via the services 2502, may enable the provisioning of logically isolated sections of the provider network 2500 to particular clients of the service provider as client private networks on the provider network 2500. At least some of a client's resources instances on the provider network 2500 may be provisioned in the client's private network. For example, in FIG. 13, RVE system 2510 may be implemented as or in a private network implementation of RVE system provider 2590 that is provisioned on provider network 2500 via one or more of the services 2502.

The provider network 2500, via services 2502, may provide flexible provisioning of resource instances to clients in which virtualized computing and/or storage resource instances or capacity can be automatically added to or removed from a client's configuration on the provider network 2500 in response to changes in demand or usage, thus enabling a client's implementation on the provider network 2500 to automatically scale to handle computation and/or data storage needs. For example, one or more additional computing resources 2522A, 2522B, 2522C, and/or 2522D may be automatically added to RVE system 2510 in response to an increase in the number of RVE clients 2582 accessing RVE system 2510 to play back and explore video content as described herein. If and when usage drops below a threshold, computing and data storage resources that are no longer necessary can be removed.

In at least some embodiments, RVE system provider 2590 may access one or more of services 2502 of the provider network 2500 via application programming interfaces (APIs) to the services 2502 to configure and manage an RVE system 2510 on the provider network 2500, the RVE system 2510 including multiple virtualized resource instances (e.g., computing resources 2522, storage resources 2552, DB resources 2554, etc.).

Provider network services 2502 may include but are not limited to, one or more hardware virtualization services for provisioning computing resource 2522, one or more storage virtualization services for provisioning storage resources 2552, and one or more database (DB) services for provisioning DB resources 2554. In some implementations, RVE system provider 2590 may access two or more of these provider network services 2502 via respective APIs to provision and manage respective resource instances in RVE system 2510. However, in some implementations, RVE system provider 2590 may instead access a single service (e.g., a streaming service 2504) via an API to the service 2504; this service 2504 may then interact with one or more other provider network services 2502 on behalf of the RVE system provider 2590 to provision the various resource instances in the RVE system 2510.

In some embodiments, provider network services 2502 may include a streaming service 2504 for creating, deploying, and managing data streaming applications such as an RVE system 2510 on a provider network 2500. Many consumer devices, such as personal computers, tables, and mobile phones, have hardware and/or software limitations that limit the devices' capabilities to perform 3D graphics processing and rendering of video data in real time. In at least some embodiments, a streaming service 2504 may be used to implement, configure, and manage an RVE system 2510 that leverages computation and other resources of the provider network 2500 to enable real-time, low-latency 3D graphics processing and rendering of video on provider network 2500, and that implements a streaming service interface 2520 (e.g., an application programming interface (API)) for receiving RVE client 2582 input and for streaming video content including real-time rendered video as well as pre-recorded video to respective RVE clients 2582. In at least some embodiments, the streaming service 2504 may manage, for RVE system provider 2590, the deployment, scaling, load balancing, monitoring, version management, and fault detection and recovery of the server-side RVE system 2510 logic, modules, components, and resource instances. Via the streaming service 2504, the RVE system 2510 can be dynamically scaled to handle computational and storage needs, regardless of the types and capabilities of the devices that the RVE clients 2582 are implemented on.

In at least some embodiments, at least some of the RVE clients 2582 may implement an RVE client interface 2684 as shown in FIG. 14 for communicating user input and interactions to RVE system 2510 according to the streaming service interface 2520, and for receiving and processing video streams and other content received from the streaming service interface 2520. In at least some embodiments, the streaming service 2504 may also be leveraged by the RVE system provider 2590 to develop and build RVE clients 2582 for various operating system (OS) platforms on various types of client devices (e.g., tablets, smartphones, desktop/notebook computers, etc.).

Referring to FIG. 13, in at least some embodiments, data including but not limited to video content may be streamed from the streaming service interface 2520 to the RVE client 2582 according to a streaming protocol. In at least some embodiments, data including but not limited to user input and interaction may be sent to the streaming service interface 2520 from the RVE client 2582 according to the streaming protocol. In at least some embodiments, the streaming service interface 2520 may receive video content (e.g., rendered video frames) from a video playback module (not shown) and/or from a rendering 2560 module, package the video content according to the streaming protocol, and stream the video according to the protocol to respective RVE client(s) 2582 via intermediate network 2570. In at least some embodiments, an RVE client interface 2684 of the RVE client 2582 may receive a video stream from the streaming service interface 2520, extract the video content from the streaming protocol, and forward the video to a display component of the respective client device for display.

Referring to FIG. 13, an RVE system provider 2590 may develop and deploy an RVE system 2510, leveraging one or more of services 2502 to configure and provision RVE system 2510. As shown in FIG. 13, the RVE system 2510 may include and may be implemented as multiple functional modules or components, with each module or component including one or more provider network resources. In this example, RVE system 2510 includes a streaming service interface 2520 component that includes computing resources 2522A, an RVE control module 2530 that includes computing resources 2522B, 3D graphics processing 2540 module that includes computing resources 2522C, 3D graphics rendering 2560 module that includes computing resources 2522D, and data storage 2550 that includes storage resources 2552 and database (DB) resources 2554. Note that an RVE system 2510 may include more or fewer components or modules, and that a given module or component may be subdivided into two or more submodules or subcomponents. Also note that two or more of the modules or components as shown can be combined; for example, 3D graphics processing 2540 module and 3D graphics rendering 2560 module may be combined to form a combined 3D graphics processing and rendering 108 module as shown in FIG. 1B.

One or more computing resources 2522 may be provisioned and configured to implement the various modules or components of the RVE system 2510. For example streaming service interface 2520, RVE control module 2530, 3D graphics processing 2540 module, and 3D graphics rendering 2560 may each be implemented as or on one or more computing resources 2522. In some embodiments, two or more computing resources 2522 may be configured to implement a given module or component. For example, two or more virtual machine instances may implement an RVE control module 2530. However, in some embodiments, an instance of a given module (e.g., an instance of 3D graphics processing 2540 module, or an instance of 3D graphics rendering 2560 module) may be implemented as or on each of the computing resource 2522 instances shown in the module. For example, in some implementations, each computing resource 2522 instance may be a virtual machine instance that is spun up from a machine image implementing a particular module, for example a 3D graphics processing 2540 module, that is stored on storage resource(s) 2552.

In at least some embodiments, computing resources 2522 may be specifically provisioned or configured to support particular functional components or modules of the RVE system 2510. For example, computing resources 2522C of 3D graphics processing 2540 module and/or computing resources 2522D of 3D graphics rendering module 2560 may be implemented on devices that include hardware support for 3D graphics functions, for example graphics processing units (GPUs). As another example, the computing resources 2522 in a given module may be fronted by a load balancer provisioned through a provider network service 2502 that performs load balancing across multiple computing resource instances 2522 in the module.

In at least some embodiments, different ones of computing resources 2522 of a given module may be configured to perform different functionalities of the module. For example, different computing resources 2522C of 3D graphics processing 2540 module and/or different computing resources 2522D of 3D graphics rendering module 2560 may be configured to perform different 3D graphics processing functions or apply different 3D graphics techniques. In at least some embodiments, different ones of the computing resources 2522 of 3D graphics processing 2540 module and/or 3D graphics rendering module 2560 may be configured with different 3D graphics applications. As an example of using different 3D graphics processing functions, techniques, or applications, when rendering objects for video content to be displayed, 3D data for the object may be obtained that needs to be processed according to specific functions, techniques, or applications to generate a 3D model of the object and/or to render a 2D representation of the object for display.

Storage resources 2552 and/or DB resources 2554 may be configured and provisioned for storing, accessing, and managing RVE data including but not limited to: pre-recorded video and new video content generated using RVE system 2510; 3D data and 3D object models, and other 3D graphics data such as textures, surfaces, and effects; user information and client device information; and information and data related to videos and video content such as information about particular objects. As noted above, storage resources 2552 may also store machine images of components or modules of RVE system 2510. In at least some embodiments, RVE data including but not limited to video, 3D graphics data, object data, and user information may be accessed from and stored/provided to one or more sources or destinations eternal to RVE system 2510 on provider network 2500 or external to provider network 2500.

Example Streaming Service Implementation

FIG. 14 illustrates an example network-based RVE system environment in which a streaming service 2504 is used to provide rendered video and sound to RVE clients, according to at least some embodiments. In at least some embodiments, an RVE environment may include an RVE system 2600 and one or more client devices 2680. The RVE system 2600 has access to stores or other sources of pre-rendered, pre-recorded video, shown as video source(s) 2650. In at least some embodiments, the RVE system 100 may also have access to stores or other sources of data and information including but not limited to 3D graphics data and user information, shown as data source(s) 2660.

RVE system 2600 may include a front-end streaming service interface 2602 (e.g., an application programming interface (API)) for receiving input from RVE clients 2682 and streaming output to RVE clients 2682, and backend data interface(s) 2603 for storing and retrieving data including but not limited to video, object, user, and other data and information as described herein. The streaming service interface 2602 may, for example, be implemented according to a streaming service 2504 as illustrated in FIG. 13. RVE system 2600 may also include video playback and recording 2606 module(s), 3D graphics processing and rendering 2608 module(s), and RVE control module 2604.

In response to user selection of a video for playback, video playback and recording 2606 module(s) may obtain pre-rendered, pre-recorded video from a video source 2650, process the video as necessary, and stream the pre-recorded video to the respective client device 2680 via streaming service interface 2602. During an RVE event in which the user pauses a video being played back, steps into a scene, and explores and possibly modifies the scene, 3D graphics processing and rendering 2608 module may obtain 3D data from one or more data sources 2660, generate a 3D modeled world for the scene according to the 3D data, render 2D representations of the 3D modeled world from user-controlled camera viewpoints, and stream the real-time rendered video to the respective client device 2680 via streaming service interface 2602. In at least some embodiments, the newly rendered video content can be recorded by video playback and recording 2606 module(s).

The RVE system 100 may also include an RVE control module 2604 that receives input and interactions from an RVE client 2682 on a respective client device 2680 via streaming service interface 2602, processes the input and interactions, and directs operations of video playback and recording 2606 module(s) and 3D graphics processing and rendering 2608 module accordingly. In at least some embodiments, RVE control module 2604 may also track operations of video playback and recording 2606 module(s). For example, RVE control module 104 may track playback of a given video through video playback and recording 2606 module(s). module so that RVE control module 2604 can determine which scene is currently being played back to a given client device 180.

In at least some embodiments, RVE client 2682 may implement a streaming service client interface as RVE client interface 2684. User interactions with a video being played back to the client device 2680, for example using RVE controls 188 as shown in FIG. 1C and as implemented on the client device 2680, may be sent from client device 2680 to RVE system 2600 according to the streaming service interfaces 2684 and 2602. Rather than performing rendering of new 3D content on the client device 2680, 3D graphics processing and rendering 2608 module(s) of RVE system 2600 may generate and render new video content for scenes being explored in real-time in response to the user input received from RVE client 2680. Streaming service interface 2602 may stream video content from RVE system 2699 to RVE client 2682 according to a streaming protocol. At the client device 2680, the RVE client interface 2685 receives the streamed video, extracts the video from the stream protocol, and provides the video to the RVE client 2682, which displays the video to the client device 2680.

Example Provider Network Environment

Embodiments of real-time video exploration (RVE) systems as described herein may be implemented in the context of a service provider that provides resources (e.g., computing resources, storage resources, database (DB) resources, etc.) on a provider network to clients of the service provider. FIG. 15 illustrates an example service provider network environment in which embodiments of RVE systems may be implemented. FIG. 15 schematically illustrates an example of a provider network 2910 that can provide computing and other resources to users 2900a and 2900b (which may be referred herein singularly as user 2900 or in the plural as users 2900) via user computers 2902a and 2902b (which may be referred herein singularly as computer 2902 or in the plural as computers 2902) via a intermediate network 2930. Provider network 2910 may be configured to provide the resources for executing applications on a permanent or an as-needed basis. In at least some embodiments, resource instances may be provisioned via one or more provider network services 2911, and may be rented or leased to clients of the service provider, for example to an RVE system provider 2970. At least some of the resource instances on the provider network 2910 (e.g., computing resources) may be implemented according to hardware virtualization technology that enables multiple operating systems to run concurrently on a host computer (e.g., a host 2916), i.e. as virtual machines (VMs) 2918 on the host.

The computing resources provided by provider network 2910 may include various types of resources, such as gateway resources, load balancing resources, routing resources, networking resources, computing resources, volatile and non-volatile memory resources, content delivery resources, data processing resources, data storage resources, database resources, data communication resources, data streaming resources, and the like. Each type of computing resource may be general-purpose or may be available in a number of specific configurations. For example, data processing resources may be available as virtual machine instances that may be configured to provide various services. In addition, combinations of resources may be made available via a network and may be configured as one or more services. The instances may be configured to execute applications, including services such as application services, media services, database services, processing services, gateway services, storage services, routing services, security services, encryption services, load balancing services, and so on. These services may be configurable with set or custom applications and may be configurable in size, execution, cost, latency, type, duration, accessibility, and in any other dimension. These services may be configured as available infrastructure for one or more clients and can include one or more applications configured as a platform or as software for one or more clients.

These services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources consisting of many processors, large amounts of memory and/or large storage capacity, and small resources consisting of fewer processors, smaller amounts of memory and/or smaller storage capacity. Customers may choose to allocate a number of small processing resources as web servers and/or one large processing resource as a database server, for example.

Provider network 2910 may include hosts 2916a and 2916b (which may be referred herein singularly as host 2916 or in the plural as hosts 2916) that provide computing resources. These resources may be available as bare metal resources or as virtual machine instances 2918a-d (which may be referred herein singularly as virtual machine instance 2918 or in the plural as virtual machine instances 2918). Virtual machine instances 2918c and 2918d are shared state virtual machine ("SSVM") instances. The SSVM virtual machine instances 2918c and 2918d may be configured to perform all or any portion of the real-time video explorer (RVE) system and RVE methods as described herein. As should be appreciated, while the particular example illustrated in FIG. 15 includes one SSVM 2918 virtual machine in each host, this is merely an example. A host 2916 may include more than one SSVM 2918 virtual machine or may not include any SSVM 2918 virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, intermediate network 2930 may, for example, be a publicly accessible network of linked networks and possibly operated by various distinct parties, such as the Internet. In other embodiments, intermediate network 2930 may be a local and/or restricted network, such as a corporate or university network that is wholly or partially inaccessible to non-privileged users. In still other embodiments, intermediate network 2930 may include one or more local networks with access to and/or from the Internet.

Intermediate network 2930 may provide access to one or more client devices 2902. User computers 2902 may be computing devices utilized by users 2900 or other customers of provider network 2910. For instance, user computer 2902a or 2902b may be a server, a desktop or laptop personal computer, a tablet computer, a wireless telephone, a personal digital assistant (PDA), an e-book reader, a game console, a set-top box or any other computing device capable of accessing provider network 2910 via wired and/or wireless communications and protocols. In some instances, a user computer 2902a or 2902b may connect directly to the Internet (e.g., via a cable modem or a Digital Subscriber Line (DSL)). Although only two user computers 2902a and 2902b are depicted, it should be appreciated that there may be multiple user computers.

User computers 2902 may also be utilized to configure aspects of the computing, storage, and other resources provided by provider network 2910 via provider network services 2911. In this regard, provider network 2910 might provide a gateway or web interface through which aspects of its operation may be configured through the use of a web browser application program executing on a user computer 2902. Alternatively, a stand-alone application program executing on a user computer 2902 might access an application programming interface (API) exposed by a service 2911 of provider network 2910 for performing the configuration operations. Other mechanisms for configuring the operation of various resources available at provider network 2910 might also be utilized.

Hosts 2916 shown in FIG. 15 may be standard host devices configured appropriately for providing the computing resources described above and may provide computing resources for executing one or more services and/or applications. In one embodiment, the computing resources may be virtual machine instances 2918. In the example of virtual machine instances, each of the hosts 2916 may be configured to execute an instance manager 2920a or 2920b (which may be referred herein singularly as instance manager 2920 or in the plural as instance managers 2920) capable of executing the virtual machine instances 2918. An instance manager 2920 may be a hypervisor or virtual machine monitor (VMM) or another type of program configured to enable the execution of virtual machine instances 2918 on a host 2916, for example. As discussed above, each of the virtual machine instances 2918 may be configured to execute all or a portion of an application or service.

In the example provider network 2910 shown in FIG. 15, a router 2914 may be utilized to interconnect the hosts 2916a and 2916b. Router 2914 may also be connected to gateway 2940, which is connected to intermediate network 2930. Router 2914 may be connected to one or more load balancers, and alone or in combination may manage communications within provider network 2910, for example, by forwarding packets or other data communications as appropriate based on characteristics of such communications (e.g., header information including source and/or destination addresses, protocol identifiers, size, processing requirements, etc.) and/or the characteristics of the network (e.g., routes based on network topology, subnetworks or partitions, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example provider network 2910 shown in FIG. 15, a host manager 2915 may also be employed to at least in part direct various communications to, from and/or between hosts 2916a and 2916b. While FIG. 15 depicts router 2914 positioned between gateway 2940 and host manager 2915, this is given as an example configuration and is not intended to be limiting. In some cases, for example, host manager 2915 may be positioned between gateway 2940 and router 2914. Host manager 2915 may, in some cases, examine portions of incoming communications from user computers 2902 to determine one or more appropriate hosts 2916 to receive and/or process the incoming communications. Host manager 2915 may determine appropriate hosts to receive and/or process the incoming communications based on factors such as an identity, location or other attributes associated with user computers 2902, a nature of a task with which the communications are associated, a priority of a task with which the communications are associated, a duration of a task with which the communications are associated, a size and/or estimated resource usage of a task with which the communications are associated and many other factors. Host manager 2915 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that provider network 2910 described in FIG. 15 is given by way of example and that other implementations might be utilized. Additionally, it should be appreciated that the functionality disclosed herein might be implemented in software, hardware or a combination of software and hardware. Other implementations should be apparent to those skilled in the art. It should also be appreciated that a host, server, gateway or other computing device may comprise any combination of hardware or software that can interact and perform the described types of functionality, including without limitation desktop or other computers, database servers, network storage devices and other network devices, PDAs, tablets, cell phones, wireless phones, pagers, electronic organizers, Internet appliances, television-based systems (e.g., using set top boxes and/or personal/digital video recorders), game systems and game controllers, and various other consumer products that include appropriate communication and processing capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Illustrative System

In at least some embodiments, a computing device that implements a portion or all of the technologies as described herein may include a general-purpose computer system that includes or is configured to access one or more computer-readable media, such as computer system 3000 illustrated in FIG. 16. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040.

Conclusion

Various embodiments may further include receiving, sending or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more hardware processors and memory and configured to implement a real-time video exploration (RVE) system comprising:
a playback module implemented via the one or more hardware processors and memory and configured to begin playback of at least a portion of a pre-recorded video to a client device; and a graphics processing and rendering module implemented via the one or more hardware processors and memory and configured to:
  receive identification input from the client device after playback of the pre-recorded video has begun, wherein the identification input identifies a particular object of a plurality of objects contained in a scene of the pre-recorded video;
  pause playback of the scene in response to the identification input;
  receive manipulation input from the client device after playback of the pre-recorded video has begun directing manipulation of the particular object in the scene of the pre-recorded video;
  obtain a model of the particular object according to graphics data for the pre-recorded video;
  manipulate the model of the particular object in a model of the scene according to the manipulation input;
  render new video of the scene including a rendering of the manipulated model of the particular object as manipulated by the manipulation input, wherein the particular object in the scene is replaced with the manipulated model of the particular object;
  stream the new video of the scene including the rendering of the manipulated model of the particular object to the client device while playback of the scene is paused; and
  resume playback of the pre-recorded video to the client device in response to resume input from the client device, wherein streaming the new video is stopped in response to the resume input.

2. The system as recited in claim 1, wherein the manipulation input directs repositioning of the particular object within the scene, and wherein the new video shows the particular object repositioned within the scene as directed by the manipulation input.

3. The system as recited in claim 1, wherein the manipulation input directs movement of the particular object within the scene, and wherein the new video shows the particular object moving within the scene as directed by the manipulation input.

4. The system as recited in claim 1, wherein the manipulation input directs changing one or more of a viewing angle or position relative to the particular object within the scene, and wherein the new video shows the particular object from the changed viewing angle or position.

5. The system as recited in claim 1, wherein the manipulation input directs manipulation of a component of the particular object, and wherein the new video shows the particular object with the component as manipulated as directed by the manipulation input.

6. The system as recited in claim 1, wherein the new video shows additional detail of the particular object that is not visible in the pre-recorded video.

7. The system as recited in claim 1, wherein the manipulation input interacts with an interface of the particular object as displayed on the client device, and wherein the new video shows a response to the interaction with the interface of the particular object.

8. The system as recited in claim 1, wherein the one or more computing devices that implement the RVE system are on a provider network, and wherein the graphics processing and rendering module is configured to leverage one or more computing resources of the provider network to perform said rendering in real time in response to the manipulation input.

9. The system as recited in claim 1, wherein the identification and the manipulation input are received from the client device according to an application programming interface (API) of the RVE system.

10. The system as recited in claim 1, wherein the particular object comprises a three-dimensional (3D) object, wherein the graphics data comprises 3D graphics data, and wherein the model of the particular object comprises a 3D model.

11. A method, comprising:
  performing, by a real-time video exploration (RVE) system implemented on one or more computing devices:
    receiving identification input that identifies a particular object of a plurality of objects in a scene of a pre-recorded video, wherein the identification input is received after playback of the pre-recorded video has begun;
    pausing playback of the scene in response to the identification input;
    receiving manipulation input directing manipulation of the particular object in the scene of the pre-recorded video, wherein the manipulation input is received after playback of the pre-recorded video has begun;
    obtaining a model of the particular object according to graphics data for the pre-recorded video;
    manipulating the model of the particular object in a model of the scene according to the manipulation input;
    rendering new video of the scene including a rendering of the manipulated model of the particular object as manipulated by the manipulation input, wherein the particular object in the scene is replaced with the manipulated model of the particular object;
    streaming the new video of the scene including the rendering of the manipulated model of the particular object to a client device while playback of the scene is paused; and
    resuming playback of the pre-recorded video to the client device in response to resume input from the client device, wherein streaming the new video is stopped in response to the resume input.

12. The method as recited in claim 11, wherein the manipulation input directs repositioning the particular object within the scene, and wherein said rendering new video of the scene including a rendering of the model of the particular object as manipulated comprises rendering the particular object as repositioned within the scene.

13. The method as recited in claim 11, wherein the manipulation input directs changing one or more of a viewing angle or position relative to the particular object within the scene, and wherein said rendering new video of the scene including a rendering of the model of the particular object as manipulated comprises rendering the particular object from the changed viewing angle or position.

14. The method as recited in claim 11, wherein the graphics processing and rendering module is further configured to obtain the model of the particular object and manipulate the model of the particular object while the pre-recorded video is paused.

15. The method as recited in claim 14, further comprising:
  in response to receiving the identification input, requesting information corresponding to the particular object; and
  receiving the information from a database, wherein the new video includes the received information.

16. The method as recited in claim 11, wherein the particular object comprises a three-dimensional (3D) object, wherein the graphics data comprises 3D graphics data, and wherein the model of the particular object comprises a 3D model.

17. A non-transitory computer-readable storage medium storing program instructions that when executed on one or more computers cause the one or more computers to implement a real-time video exploration (RVE) system configured to:
- receive identification input from a client device identifying a particular object of a plurality of objects in a scene of a pre-recorded video, wherein the identification input is received after playback of the pre-recorded video has begun;
- pause playback of the scene in response to the identification input;
- receive manipulation input from the client device directing manipulation of the particular object in the scene of the pre-recorded video;
- obtain a model of the particular object according to graphics data for the pre-recorded video;
- manipulate the model of the particular object in a model of the scene according to the manipulation input;
- render new video of the scene including a rendering of the manipulated model of the particular object as manipulated by the manipulation input, wherein the particular object in the scene is replaced with the manipulated model of the particular object;
- stream the new video of the scene including the rendering of the manipulated model of the particular object to the client device while playback of the scene is paused; and
- resume playback of the pre-recorded video to the client device in response to resume input from the client device, wherein streaming the new video is stopped in response to the resume input.

18. The non-transitory computer-readable storage medium as recited in claim 17, wherein the manipulation input directs repositioning or moving the particular object within the scene, and wherein the new video shows the particular object as repositioned or moved within the scene.

19. The non-transitory computer-readable storage medium as recited in claim 17, wherein the manipulation input directs manipulation of a component or interface of the particular object, and wherein the new video shows the particular object with the component or interface as manipulated.

20. The non-transitory computer-readable storage medium as recited in claim 17, wherein the particular object comprises a three-dimensional (3D) object, wherein the graphics data comprises 3D graphics data, and wherein the model of the particular object comprises a 3D model.

* * * * *